(12) United States Patent
Johnson et al.

(10) Patent No.: US 12,284,727 B1
(45) Date of Patent: Apr. 22, 2025

(54) SENSOR SYSTEM WITH INTEGRATED CONVECTION HEATING

(71) Applicant: Zoox, Inc., Forster City, CA (US)

(72) Inventors: Daniel Glenn Johnson, San Francisco, CA (US); Arvind Pattabhiraman, Alameda, CA (US); Alexander Winter, Sunnyvale, CA (US); Austin In-Jei Yi, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 809 days.

(21) Appl. No.: 17/503,191

(22) Filed: Oct. 15, 2021

(51) Int. Cl.
| | | |
|---|---|---|
| *H05B 1/02* | (2006.01) | |
| *B60S 1/02* | (2006.01) | |
| *G01S 7/481* | (2006.01) | |
| *G01S 7/497* | (2006.01) | |
| *H05B 3/84* | (2006.01) | |

(52) U.S. Cl.
CPC ............ *H05B 1/0236* (2013.01); *B60S 1/026* (2013.01); *G01S 7/4813* (2013.01); *G01S 7/497* (2013.01); *H05B 3/84* (2013.01); *G01S 2007/4977* (2013.01)

(58) Field of Classification Search
CPC .......................... H05K 5/0004; H05K 1/0274
See application file for complete search history.

(56) References Cited

U.S. PATENT DOCUMENTS

| | | | | |
|---|---|---|---|---|
| 2019/0179028 | A1* | 6/2019 | Pacala | .................. G01S 7/4816 |
| 2019/0377064 | A1* | 12/2019 | Scheske | .................. G01S 7/497 |
| 2021/0063729 | A1* | 3/2021 | Shimizu | .................. B08B 17/00 |

* cited by examiner

*Primary Examiner* — Thien S Tran
(74) *Attorney, Agent, or Firm* — Lee & Hayes, P.C.

(57) ABSTRACT

A system and method to defog and/or defrost a sealed sensor system housing window to improve transmission of an electromagnetic wave through the housing window. The system includes at least a heater provided in a sealed sensor system housing to emit heat into the housing. The heat is then distributed via convection promoted by a moving component of the sensor system, a fan, or a combination of both. Additionally or alternatively, heat may be transferred to the housing window via conduction. A controller can be configured to activate or deactivate the heater based on a determined or predicted state.

20 Claims, 9 Drawing Sheets

SENSOR SYSTEM WITH INTEGRATED CONVECTION HEATING

BACKGROUND

Many jurisdictions have implemented vehicle safety standards to improve vehicle safety. These standards address various aspects of a vehicle operation and system requirements. In some jurisdictions, these standards require that vehicles be equipped with defrosting and defogging capabilities of a front windshield. This safety requirement can ensure visibility through the windshield during vehicle operation.

With the implementation of autonomous vehicles, it may be advantageous to take into account these or similar standards in the implementation of vehicle sensors used to capture a vehicle surrounding during vehicle operation to enhance safety.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1A:
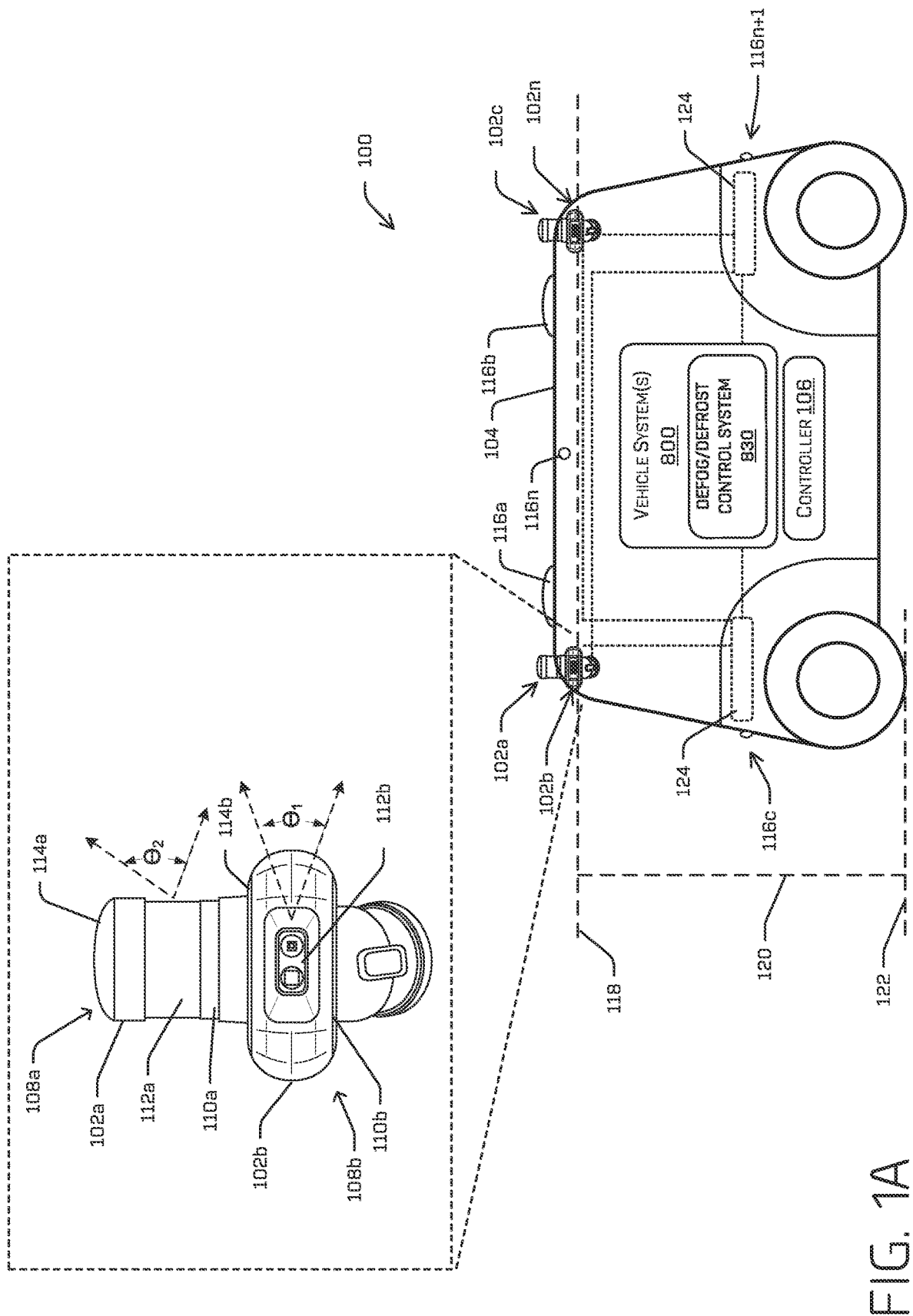
FIGS. 1A and 1B illustrate an example vehicle and one or more encased sensor systems for the vehicle.

This application relates to a system and method of defogging and/or defrosting a window of a sensor system. In examples, the sensor system may be one configured to transmit and receive electromagnetic waves. In examples, the electromagnetic waves can be in the visible or infrared range. In examples, the sensor system is a light detection and ranging ("lidar") sensor. In examples, the lidar system may be a mechanical sensor, a solid-state sensor, or a combination of both. In examples, heat may be introduced into a sensor system housing that includes a window to be defrosted and/or defogged. The window may be transparent to the electromagnetic waves emitted by the sensor. The heat may be distributed within the housing via convection. In examples, convention may be promoted via one or more fans, mechanical motion of one or more sensor components, or a combination thereof. Heat may be inducted into the housing via one or more heaters. In examples, a heater may be a resistive heater. In examples, one or more heater resistors may be provided at a base portion of the sensor system, at a base portion of a sensor system housing, at a cap or top portion of the sensor system and/or sensor system housing, on one or more components of the sensor system that is located inside the sensor system housing, or any combination thereof. In examples, the one or more heater resistors may be controlled by one or more system controllers.

In cases, fogging and/or frosting of the widow may interfere with the transmission of electromagnetic emissions. Interference can diminish sensor accuracy and/or clarity of perception.

Provided are sensor systems, at least partially if not fully encased in a sealed housing with one or more widows through which electromagnetic emissions are transmitted, that may be used in vehicles and that may alleviate the fogging and/or frosting problem by providing a means to defog and/or defrost the housing window. In examples, a sensor system with defrosting and/or defogging capabilities as described herein may be provided on a vehicle. In examples, the heating may be provided via convection heating.

In examples, the vehicle may be an autonomous vehicle. In examples, the vehicle may be an autonomous driving automobile. In examples, the vehicle may be an automobile equipped with one or more sensor systems with defrosting and/or defogging capabilities as described herein.

In examples, an internal space defined by a housing enclosing one or more components of a sensor system may be sealed. In examples, a sealed internal space as discussed herein may be rated to IP67 as defined by the International Electrotechnical Commission (IEC) 60529 Standards. In this manner, in examples, once the sensor system is built and/or installed, little to no additional moisture may be allowed inside the internal space. In examples, it may be undesirable to let additional moisture seep into the internal space as moisture may exacerbate the fogging and/or frosting of the window especially at an internal surface of the window facing the internal space. Additionally, it may be desirable to maintain the internal space sealed at a low moisture or dry conditions to better protect the sensor system electronics or other components encased by the housing. In examples, the housing may be configured to allow for pressure equalization of a sealed internal space. For example, a valve may be coupled to the housing to allow limited amounts of air to transition into or out of a sealed volume contained therein when, for example, the valve is opened. At other times, the valve may remain closed to impede airflow.

In examples, a vehicle may include a housing encasing a sealed space, the housing comprising a window configured to allow transmission of electromagnetic emissions; a heater disposed in or on the housing; and a rotatable assembly disposed in the housing and configured to rotate relative to the housing, the rotatable assembly may include an emitter to emit the electromagnetic emissions through the window into an environment; a detector to detect electromagnetic emissions reflected through the window from objects in the environment; and a protrusion extending from a portion the rotatable assembly configured to move air within the sealed space to promote convective heat transfer from the heater to the window during rotation of the rotatable assembly within the housing.

In examples, an encased sensor system may include a housing comprising a base, a window, and a top portion; a sensor system at least partially encased and sealed in the housing, the sensor system configured to transmit and receive electromagnetic emissions; a heater in a portion of the housing; and one or more computing devices including one or more processors, wherein the one or more computing devices are configured to control the heater to defog or defrost the window.

In examples, a method of defogging or defrosting a transmission window of an encased sensor system that may include determining or predicting the presence of fogging or frosting on a surface of a transmission window of a sealed sensor system housing; activating a heater provided inside the sealed sensor system housing; convection heating the transmission window of the sealed sensor system housing to cause defogging or defrosting of the transmission window.

The techniques and systems described herein may be implemented in a number of ways. Example implementations are provided below with reference to the figures.

FIG. 1 illustrates an example of vehicle 100 in which one or more encased sensor systems 102, such as lidar system may be employed. In examples, the encased sensor system may include a sensor other than a lidar. For example, the encased sensor system 102 may include an infrared sensor, a time of flight sensor, a radar, a camera, or any like sensors. In the illustrated example, vehicle 100 may include an automobile. In examples, vehicle 100 may include a water vehicle, a land vehicle, an air vehicle, or any combination thereof. For illustration purposes, the invention will be described in conjunction with an automobile however, it should be understood that similar system would be similarly implemented in other types of vehicle. In examples, vehicle 100 may be an autonomous vehicle. In examples, vehicle 100 may include a hybrid of autonomous and operator-controlled vehicle. In examples, an operator can control vehicle 100 remotely or by presently being in vehicle 100. For the purposes of this description, the vehicle 100 is described as an autonomous vehicle. Similar operation can be implemented in operator-controlled vehicles.

Figure 1B:
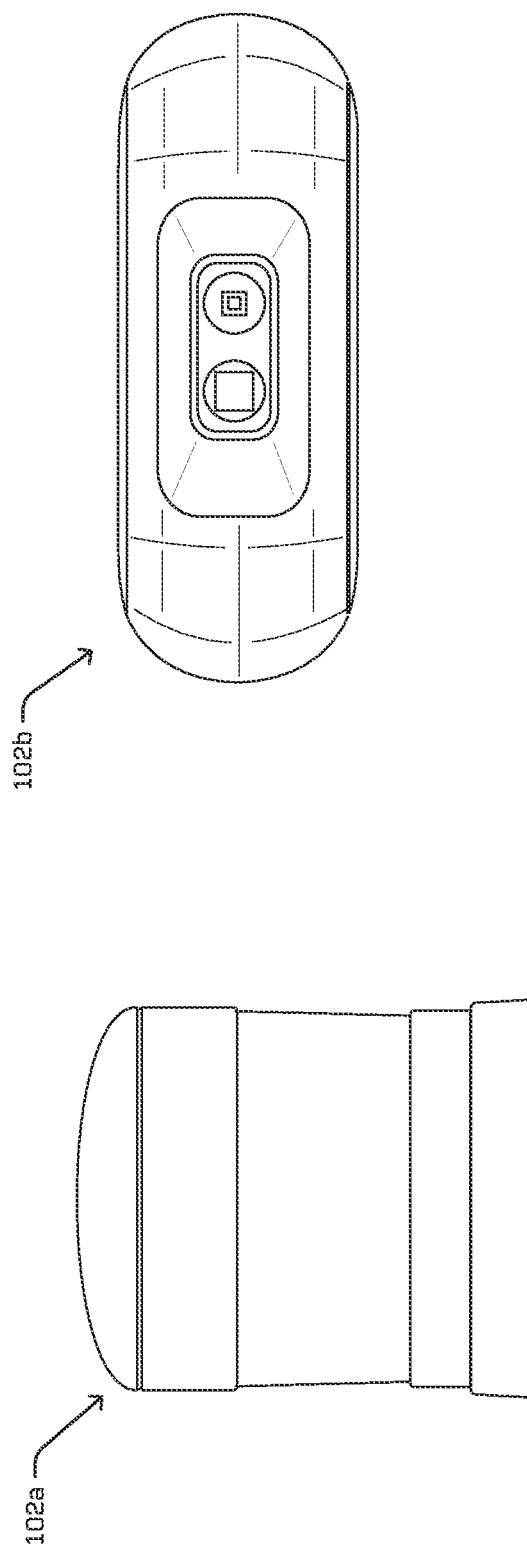

FIG. 1A provides a side view of a vehicle 100 that can include one or more encased sensor systems 102a, 102b, 102c, . . . 102n. In examples, as shown, sensor systems 102 may be provided in combination where two or more sensors have connected housings as for example, 102a and 102b are shown in FIG. 1A. In examples, an encased sensor systems 102 may be provided as stand-alone encased sensor systems separate and apart from one or more other encased sensor systems as for example shown in FIG. 1B. In examples, vehicle 100 may include one or more additional sensors 116a, 116b, 116c, . . . 116n, 116n-1 at different locations of vehicle 100. In examples, the one or more additional sensors 116 may be the same or different from an encased sensor 102.

In examples, as shown, one or more sensor systems 102 can be located at one or more locations on vehicle 100 that allows for unobstructed views. In examples, one or more sensor systems 102 may be located on a roof portion 104 of a vehicle 100. Each sensor system 102 may be controlled by a controller 106 and/or by the vehicle control system 800 having, for example a defogging/defrosting control system 830, as described later. In examples, each sensor system 102 may have its own dedicated controller 106. In examples, a common controller 106 may be employed to control two or more sensor systems 102. Controller 106 may be implemented in hardware, software, or a combination thereof as similarly described later with respect to the vehicle control system. In examples, each sensor system 102 may exhibit field of views θ in the vertical (e.g. $θ_1$, and $θ_2$) and horizontal directions. In examples, a field of view of one sensor system 102 may be the same or different from that of another. For examples, as illustrated, sensor system 102a may have a horizontal field of view $θ_5$ that is 360°, while sensors 102d may have a horizontal field of view that is less than 360°.

In some examples, the vehicle 100 may have a longitudinal axis 118 running the length of the vehicle 100. In some examples, an encased sensor systems 102 may be disposed on the body of vehicle 100 at an elevation 120 above a ground interface 122. In some examples, an encased sensor system 102 may be located at a height or elevation on the vehicle such that the sensors of the sensor system may be able to see over most obstacles that the vehicle may encounter. For example, it may be advantageous to see over an obstacle allowing the vehicle's system to observe and react to not only the obstacle, but also observe and react to any additional obstacle or condition beyond the obstacle. In some examples, it is advantageous to observe an obstacle from an elevated angle where the elevated angle may allow the vehicle's system to better determine one or more of a distance, a closing rate, a status, a direction, among others.

In examples, an encased sensor system 102 may be encased in housing 108. In examples, the housing 108 may include a base 110, a window 112, and top portion or cap 114. Base 110 and cap 114 may be formed of any suitable including metal, plastic or other polymer material, fiberglass, ceramic, or any combination thereof. In examples, base 110 and cap 114 are opaque materials. In examples, window 112 may include a translucent material. In examples, window 112 may be configured to allow light emitted by the sensor system 102 to pass through. In examples, window 112 may be configured to allow light reflected off an object or surface to pass through so that it may be detected by a photosensor comprised in sensor system 102. In examples, a window 112 may include a translucent material. A translucent material is one that allows the transmission of electromagnetic waves or emissions at least in the visible and/or infrared range. In examples, a window 112 may be configured to allow transmission of electromagnetic emissions. In examples, a widow 112 may include a material configured to allow transmission of electromagnetic waves or emissions without distortion or attenuation. In examples, the window 112 may be configured to be transparent (e.g., not induce substantial distortion or attenuation) to electromagnetic emissions of a corresponding system (e.g., the window may be transparent for emissions within certain frequency range(s)). In examples, window 112 may include glass, plastic or other polymer material such as poly(methyl methacrylate) (PMMA) or plexiglass, or any combination thereof. In examples, window 112 may be aligned with one or more lens elements of sensor system 102.

In examples, vehicle 100 may include one or more sensor cleaning systems 124. In some examples, cleaning system 124 may comprise a reservoir, fluid, pressuring, a pump, valves and may be connected to one or more of the sensor systems 102. In examples, the vehicle 100 may include multiple cleaning systems 124. In examples, a cleaning system 124 may be coupled to one or more of the sensor systems 102. In examples, one cleaning system 124 may be coupled to a first subset of the sensor systems 102, for example, including the sensor system 102a, and another cleaning system 124 may be coupled to a second subset of the sensor systems 102, for example, including sensor system 102b and/or 102c. In examples, a cleaning system 124 may be located within vehicle 100. In examples, a cleaning system 124 may be disposed within a detachable portion of the vehicle 100, for example, a drive module.

In examples, the encased sensor systems 102 can be a mechanical sensor system or a solid-state sensor system. A mechanical sensor system refers to a sensor system having one or more moving components. In examples, an encased mechanical sensor system may include at least one component that rotates, slides, displaces, translates or otherwise moves inside the sensor system housing. A solid-state sensor system refers to a sensor system that is static and does not include any moving components. In examples, no mechanical portion of a solid-state system moves inside a sensor system housing.

In examples, the one or more encased sensor systems 102 can be lidar systems. As used herein, a lidar system refers to a system configured to measure flight of time of a light signal as it travels from a light source such as a laser, to a surface, and back to a light sensor. Using this technique, a distance may be calculated based on the flight time and the known speed of light.

A lidar system may generally include at least one light emitter and a corresponding light sensor. In examples, the light emitter may include a laser that directs light in the direction of an object or surface. In examples, the light sensor may include a photodetector, such as a photomultiplier or avalanche photodiode (APD) that may be configured to convert light intensity to a corresponding electrical signal. In examples, one or more optical elements such as lenses may be used in the light transmission and reception paths to focus light. In examples, a lidar system may include signal processing components configured to analyze reflected light signals to determine the distances to surfaces from which the emitted light has been reflected.

In examples, the lidar system can be a mechanical sensor system, a solid-state sensor system, or a combination thereof. For purposes of this description, a mechanical lidar system refers to a lidar system including a rotatable chassis containing one or more components. A solid-state lidar system, as referenced herein, refers to a lidar system that does not include moving components.

Figure 2:
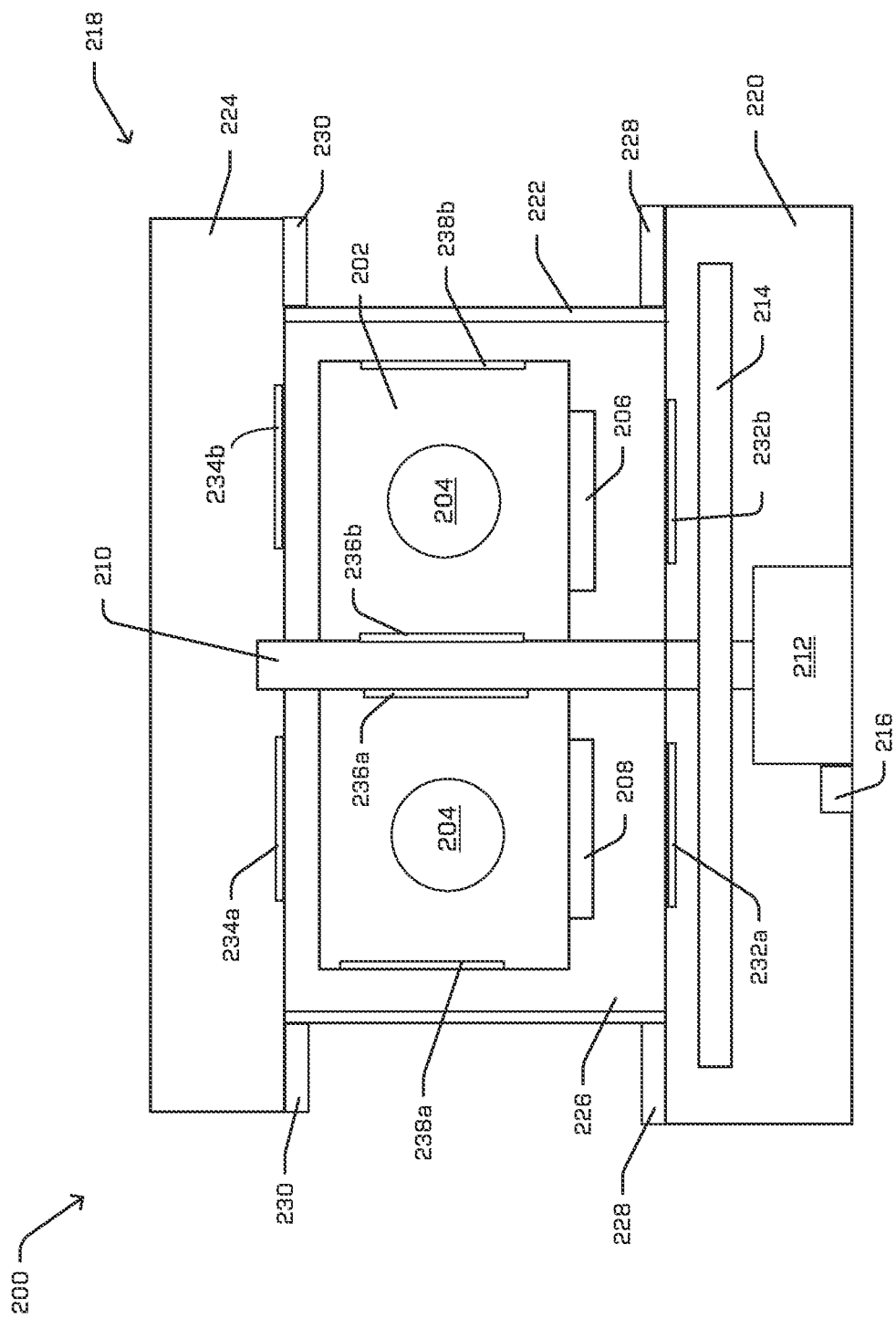
FIG. 2 illustrates a simplified example diagram of an encased mechanical lidar system including one or more heaters for defogging and/or defrosting the housing window.

FIG. 2 illustrates a simplified example diagram of an encased mechanical lidar system 200. In examples, mechanical lidar system 200 may include a rotatable assembly 202 including a lens system 204. In examples, rotatable assembly 202 may also include a photosensor 206 and a transmitter or light emitter 208 such as a laser diode. In examples, rotatable assembly 202 is mounted on a spindle 210 operatively connected to a motor 212. In examples, rotatable assembly 202 may include one or more protrusions such as fins or vanes configured to extend radially or axially from a center portion of the rotatable assembly 202 and/or from spindle 210. In examples, motor 212 may have controllable speeds. In examples, motor 212 may be an electric motor. In examples, motor 212 includes a step motor. In examples, motor 212 may include a DC motor, an AC motor, a direct drive motor, a linear motor, a stepper motor, a servo motor, or any combination thereof. In examples, motor 212 includes a servo motor. In examples, system 200 may include one or more electronics such as electronic components 214. In examples, electronic components 214 may include one or more of a printed circuit boards (PCB), one or more processors, memory, capacitors, other electronics to control operation of the sensor, or any combination thereof. In examples, the electronic components 214 may include one or more logic components arranged in a printed circuit board (PCB). As illustrated, in examples, mechanical lidar system 200 may be powered via a power connection 216. In examples, power connection 216 may include a connection to a vehicle onto which mechanical lidar system 200 is installed.

As illustrated in FIG. 2, in examples, lidar system 200 may be encased in a housing 218. Housing 218 may include a base 220, a window 222, and a top portion or cap 224 as previously described. In examples, housing 218 defines an internal space 226. In examples, the internal space 226 encases at least a portion of the sensor system 200. In examples, at least a portion of boundary of internal space 226 may be defined by window 222. In examples, mechanical lidar system 200 does not fully completely fill internal space 226. In examples, internal space 226 is sized and configured so that rotatable assembly 202 is allowed to rotate as spindle 210 is spun by motor 212. In examples, internal space 226 may be a sealed space. In examples, a seal space does not allow for transfer of moisture. In examples, housing 218 may be configured to allow for pressure equalization of internal space 226. In examples, housing 218 is configured to prevent any moisture or fluid flow in and out of internal space 226. In examples, window 222 extends along the full perimeter of housing 218. In examples, mechanical lidar system 200 is able to scan a horizontal angle of 360° as rotatable assembly 202 is rotated by spindle 210 and motor 212 transmitting and receiving electromagnetic waves or emissions in the visible and/or infrared spectrum through window 222 of housing 218.

In examples, the air enclosed in the internal space defined by a housing enclosing a sensor system, for example the previously described internal space 226, may contain moisture. In examples, the moisture present inside the housing may cause the inner surface of the window of the housing to fog. In examples, the moisture present outside the housing may cause the outer surface of the window of the housing to fog. In examples, a cold temperature and moisture in the environment around and/or outside the sensor system housing may cause frost to form over an outer surface of the window. In summary, condensation of moisture can be caused by a contact between moist air and a relatively cold surface.

For purposes of this description, the inner surface of a housing window refers to the surface of the window that interfaces with the inside space of the sensor system housing. Consequently, the outer surface of a housing window refers to the surface of the window that interfaces with the environment surrounding the sensor system housing.

In examples, as previously described, the window of a sensor system housing may be configured to allow transmission of electromagnetic waves or emissions. In examples, the window may be configured to allow transmission of electromagnetic waves or emissions without distortion or attenuation. In examples, fogging and/or frosting of the window may interfere with the transmission of electromagnetic waves or emissions by inducing distortion and/or attenuation and thus with the proper functioning of the sensor system.

In examples, heat may be employed to defog and/or defrost the window of the sensor system housing. In examples, as shown in FIGS. 2, one or more heaters may be provided in the sensor system housing, a sensor system component, or any combination thereof.

In examples, a heater may include a type of device able to radiate heat. In examples, a heater may include a resistance heater, a heat exchanger, or any like structure. In examples, as described herein, a heater can include a resistance heater. A resistance heater may include a resistor configured to convert electrical energy to heat energy. In examples, a resistance heater may be configured to heat when electricity or electrical current flows through it. Any suitable material may be used to form a resistance heater. In examples, a resistance heater can include a metal or metal alloy, a ceramic, a semiconductor, a polymer, or any combination thereof. In examples, a resistance heater may include a metal such as nickel, chromium, iron, copper, or aluminum, metal alloy such as nichrome (for example 80/20 nickel-chromium alloy), iron chromium aluminum alloy, copper nickel alloy, a ceramic or semiconductor material such as molybdenum disilicide, silicon carbide, positive thermal coefficient (PTC) ceramic such as barium titanate or lead titanate composites, quartz halogen, or any combination thereof. In examples, a heater may include any suitable shape. In examples, a heater may be circular, oval, quadrilateral, oblong, triangular, or any have any regular or irregular shape.

In examples, one or more heaters as described below may be implemented alone or in combination. In examples, one or more heaters may be configured to cause heating of at least a portion of the housing window, at least a portion of an inner or outer surface of the housing window, and/or at least a portion of the housing window surrounding area.

In examples, one or more heaters may be provided adjacent to and/or proximate to the housing window. In examples the heaters may be located at an outer surface of the sensor system housing. In examples the heaters may be located at an inner surface of the sensor system housing. In examples the heaters may be located at both an outer surface and an inner surface of the sensor system housing. For example, as illustrated in FIG. 2, one or more heaters 228, and/or 230 may be provided at a portion of the sensor housing, proximate to and/or adjacent to the window. In examples, as shown in FIG. 2, if the housing includes a window extending along the full lateral perimeter of the housing, a window bottom heater 228 and/or window top heater 230 may be provided as a ring around or adjacent a bottom and/or a top portion of the window. In examples, one or more heaters 228 and/or 230 may be provided at a periphery of the housing window. In examples, by radiating heat at or in proximity to the window, it may be possible to heat the window and/or window surrounding areas inside and/or outside of the housing sufficiently to promote defogging of the window and/or defrosting the window.

In examples, one or more heaters may be provided internal to sensor system housing. In examples, where the heaters are internal to the housing, the heat radiated may be more efficiently and effectively utilized to help defog and/or defrost the window.

In examples, as shown in FIG. 2, one or more heaters may be provided at the top or base of the sensor system housing. In examples, one or more base heaters 232 may be located at a base of the sensor system housing. In examples, the base heaters 232 may be near, proximate, or at the internal surface of the base of the sensor system housing interfacing with the internal space 226 as previously described. In examples, the base of the sensor system housing may include an upper portion and a lower portion and one or more heaters 232 may be located in the upper portion and/or lower portion of the base. In examples, one or more heaters 232 may be located in an upper portion of the base of the sensor system housing at a location near, proximate, or at the interface between the base of the sensor system housing and the internal space 226 as previously described. In examples, one or more cap heaters 234 may be located at a top portion or cap of the sensor system housing. In examples, the cap heaters 234 may be near, proximate, or at the internal surface of the top portion or cap of the sensor system housing interfacing with the internal space 226 as previously described. In examples, heaters 232 and/or 234 may be provided adjacent to and/or proximate to the window. In examples, oner or more heaters 232 may be located in an upper portion of the base of the sensor system housing that may be in contact with the window and may be configured to conductively transfer heat from the one or more heaters 232 to the window. In examples, oner or more heaters 234 may be located in a lower portion of the top portion or cap of the sensor system housing that may be in contact with the window and may be configured to conductively transfer heat from the one or more heaters 234 to the window. In examples, heaters 232 and/or 234 may be provided closer to a central and/or internal portion of the sensor system housing.

In examples, one or more heaters may be provided on one or more components of the sensor system enclosed in the sensor system housing. For examples, one or more spindle heaters 236 may be provided along a spindle 210 of a mechanical lidar system 200. In examples, one or more rotatable assembly heaters 238 may be provided on one or more portions of the rotatable assembly 202 of a mechanical lidar system 200.

In examples, the housing window 222 may include one or more inductive heaters or heating elements. In examples, a heating filament, coating, pattern or like heat inductor may be provided in at least a portion of the housing window. In examples, the heating filament, coating, or pattern may include an electrically conductive material provided on at least a portion of a surface of and/or within the thickness of housing window 222. In examples, a heater or heating element incorporated in the housing window 222 may be configured to not interfere with the transmission of the electromagnetic waves or emissions transmitted and received by the sensor system.

In examples, convection heating inside the sensor system housing may be employed to defog and/or defrost the sensor system housing window. In examples, convention heating may be used to cause heating of at least a portion of the housing window, at least portion of an inner or outer surface of the housing window, and/or at least a portion of the housing window surrounding area. In examples, convection heating may be realized by causing heat radiated into a sensor system housing to circulate within the internal space defined by the sensor system housing. In examples, as described in more detail below, the circulation of heat may be promoted by one or more moving components of the sensor system. In examples, circulation of heat within the sensor system housing may be promoted and/or enhanced by one or more fans as described later with reference to a solid-state sensor system. In examples, the same fan configuration as later described with reference to a solid-state sensor system can be equally implemented to a mechanical sensor system. In examples, circulation of heat within a sensor system housing may be promoted and/or enhanced by a combination of one or more moving parts of a sensor system and one or more fans.

Figure 3:
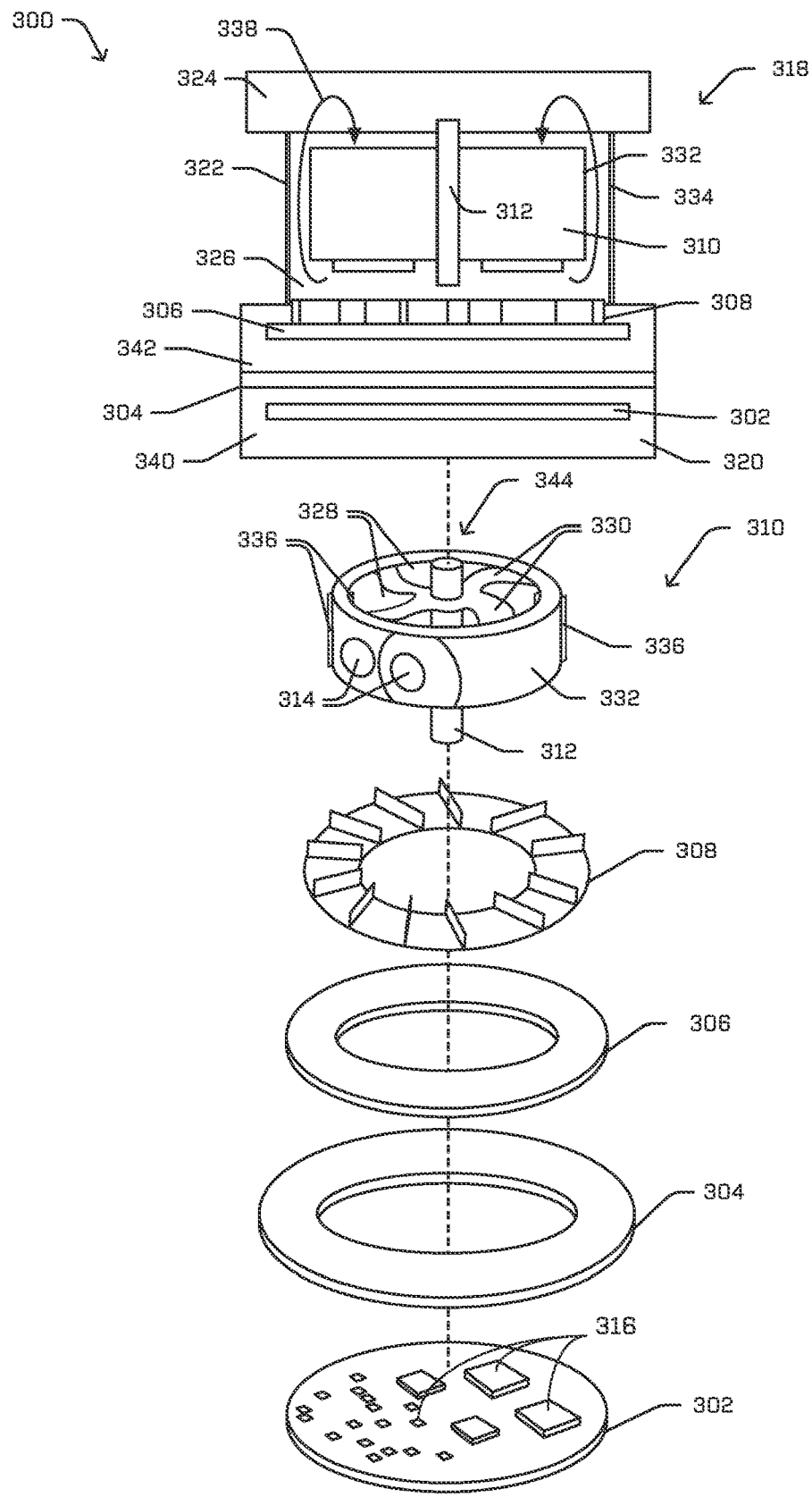
FIG. 3 illustrates a first example of sensor system with one or more moving components or parts including one or more heaters for defogging and/or defrosting the housing window.

FIG. 3 illustrates an example of sensor system with one or more moving components or parts. For description purposes, examples are described and illustrated employing a mechanical lidar. Other sensors with one or more moving parts may also be used. Illustrated is an example of a mechanical lidar system 300 in its assembled state with accompanying exploded view of the various components. In examples, the heating in the sensor system housing may be arranged to achieve circulation within the internal space defined by the sensor system housing.

In examples, the mechanical lidar system 300 may include electronics 302, a thermal isolator 304, a heater 306, a heatsink 308, a rotatable assembly or a rotatable assembly 310, and a spindle 312. In examples, electronics 302 may include one or more of a printed circuit boards (PCB), one or more processors, memory, capacitors, other electronics to control operation of the sensor, or any combination thereof. In examples, electronics 302 may include a printed circuit board (PCB) as shown in FIG. 3. It should be understood that other electronics may be employed in addition to and/or in place of the PCB. In examples, as illustrated, heater 306 may be a resistance heater. Assembly 310 may include a lens system 314. The electronics 302, for example, a printed circuit board (PCB), may include one or more integrated circuit components 316 such as photosensors, transmitters and/or light emitters, and processors. In examples, one or more mirrors may be implemented to direct light to and from a photosensor and a transmitter. A housing 318 including a base 320, a window 322, and a top portion or cap 324, may enclose the mechanical lidar system 300 and define an internal space 326. In examples, at least a portion of boundary of internal space 326 may be defined by window 322. In examples, internal space 326 may enclose at least a portion of the mechanical lidar system 300. In examples, internal space 326 may be a sealed space. In examples, the housing 318 may be configured to allow for pressure equalization of a sealed internal space 326.

In examples, as shown in FIG. 3, the electronics 302, thermal isolator 304, heater 306, and heatsink 308 may be located in base 320 of housing 318. In examples, the base may have a base lower portion 340 and a base upper portion 342. In examples, the electronics 302 may be located in the base lower portion 340 and/or base upper portion 342. In examples, the base upper portion 342 and/or base lower portion 340 may be coupled to and/or house heater 306. In examples, the electronics 302 may be located in the base lower portion 340 and the heater 306 may be coupled to and/or housed in the base upper portion 342. In examples, the thermal isolator may be interposed between the base lower portion 340 and the base upper portion 342. In examples, the thermal isolator 304 may be arranged to thermally insulate the electronics 302 from the heater. In examples, the thermal isolator 304 may be arranged to thermally insulate the lower portion 340 of base 320 from upper portion 342 of base 320.

In examples, although not illustrated, a heater 306 may be provided in the top portion or cap 324 instead of base 320. In examples, a first heater 306a may be provided in base 320, and a second heater 306b may be provided in top portion or cap 324.

In examples, although not illustrated, the top portion or cap 324 may a cap upper portion and a cap lower portion and have the electronics 302, thermal isolator 304, and heater 306 arranged in any manner as described for base 320.

As illustrated, the electronics 302, such as a PCB, may be protected from excessive heat radiating from the heater 306 by placing the thermal isolator 304 between the electronics 302 and the resistance heater 306. Also, as illustrated, in examples, the heater 306 may be positioned closest to the internal space 326 defined by housing 318 than the electronics 302. In examples, the mechanical lidar system 300 may include a motor operatively connected to spindle 312. A motor is not illustrated in FIG. 3; however, a motor was described earlier with reference to FIG. 2. In examples, the motor may be positioned below or above electronics 302. In examples, the motor may be positioned below or above thermal isolator 304. In examples, the motor may be positioned the base upper portion 342 or the base lower portion 340. In examples, the motor may be position in the cap upper portion or the cap lower portion.

As illustrated, a heatsink 308 may be positioned between resistive heater 306 and the internal space 326 of the sensor system housing 318. In examples, the heatsink 308 positioned between the heater and the internal space 326 can assist in promoting heat transfer from the heater 306 to the internal space 326.

In examples, the mechanical lidar system 300 may take advantage of the rotatable assembly 310 to promote convection of the heat radiated by resistance heater 306. In examples, as the heater 306 operates it radiates heat that travels into internal space 326. As the mechanical lidar system 300 operates to scan the surrounding environment, the motor rotates the operably connected spindle 312. As spindle 312 rotates, it causes rotation of assembly 310 operably connected to spindle 312. In examples, as illustrated, assembly 310 may be configured to include a fan and/or fin design. In examples, assembly 310 may include one or more hollow regions 328 defined by one or more fins or vanes 330. In examples, fins or vanes 330 may be configured to radially or axially extend from a center portion 344 of the rotatable assembly 310 and/or from spindle 312. In examples, as assembly 310 rotates, it can cause heat to travel through one or more hollow regions 328. In examples, a hollow region 328 may improve heat circulation and thus convection. In examples, a hollow region 328 may be configured to house components of the sensor system such as emitter and receiver electronics. In examples, a hollow region 328 may house one or more sensor system components and improve heat circulation. In examples, as assembly 310 rotates, it may cause heat to travel between an outer surface 332 of assembly 310 and an inner surface 334 of window 322.

In examples, assembly 310 may include additional protrusions 336 such as extensions, wings, or like structure in a hollow region 328 and/or at an outer surface 332 to further promote heat circulation.

In examples, as heat is distributed within housing 318 it can increase the temperature at one or more surfaces of window 322. Increase in temperature at a surface of window 322 may cause moisture to evaporate and thus defog window 322, and/or for frost to melt and thus defrost window 322.

In examples, convection heating may be promoted by causing heat to flow in any direction. In examples, heat flow may be in a vertical direction. In examples, heat may be caused to assume a circular flow 338 such that heat flows toward the housing base 320 and toward the top portion or cap 324. In examples, heat may flow in a horizontal direction. In examples, heat may be caused to assume a circular flow that is parallel to the housing base 320, the top portion or cap 324, or both. In examples, heat may assume a turbulent flow with housing 318 and/or within internal space 326. In examples, any combination of different flows may be achieved.

Figure 4:
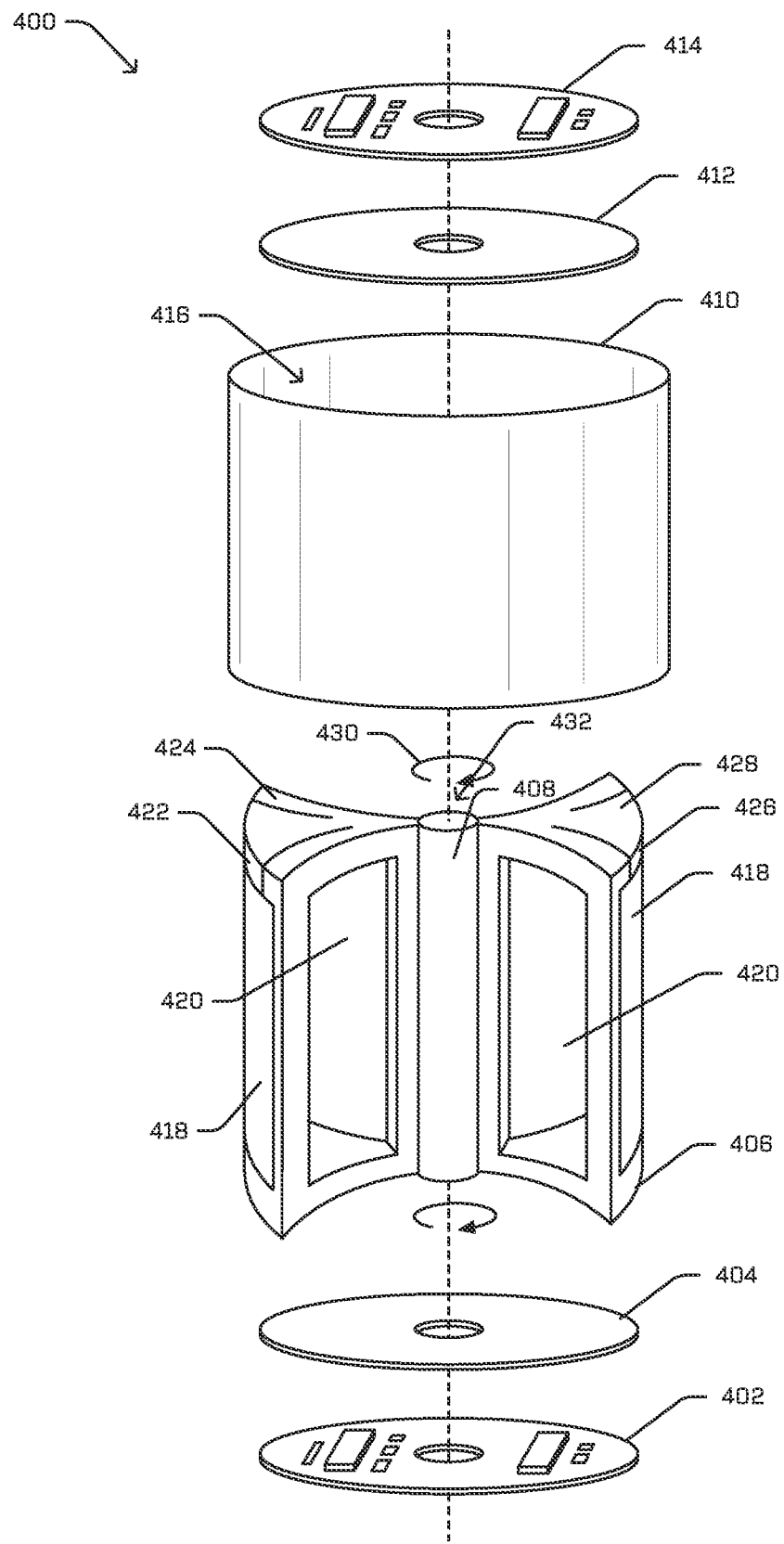
FIG. 4 illustrates a second example of a sensor system with one or more moving components or parts including one or more heaters for defogging and/or defrosting the housing window.

FIG. 4 illustrates an exploded view of another arrangement example of a sensor system. In examples, the sensor system 400 may include a mechanical lidar system. For simplicity, FIG. 4 does not illustrate the base and top portion or cap of a housing. Illustrated is a sensor system configured to include electronics such as a first PCB 402 and a second PCB 414. In examples, other electronics such as one or more additional printed circuit boards (PCB), one or more processors, memory, capacitors, other electronics to control operation of the sensor, or any combination thereof may be present in addition to and/or in place of PCBs 402 and 414. In examples, as illustrated, a sensor system may be configured to include a first PCB 402, first thermal isolator 404, a rotatable assembly 406, attached to a spindle 408, a lens system 410, a second thermal isolator 412, and a second PCB 414. In examples, the lens system 410 may also act as a housing window and define together with a housing base and a housing top portion or cap, an internal space 416. In examples, internal space 416 may encase at least a portion of the sensor system 400. In examples, internal space 416 may be a sealed space. In examples, the housing of sensor system 400 may be configured to allow for pressure equalization of a sealed internal space 416. In examples, the first and second thermal isolators 404 and 412 may be located between an internal space 416 of the sensor system housing and the respective first and second PCBs 402 and 414. In examples, the first and second thermal isolators 404 and 412 may be configured to insulate, protect, or shield the electronics, such as first and second PCBs 402 and 414, from the heat radiated by one or more heaters 418. This may help prevent the electronics, such as first and second PCBs 402 and 414, from overheating.

In examples, spindle 408 may be operably connected to a motor (not shown) as previously described. In examples, a housing base may house the electronics such as the first PCB 402 and first thermal isolator 404. In examples, the housing base may be as previously described. In examples, the housing base may have a base lower portion and a base upper portion. In examples, one or more electronics of sensor system 400 may be located in the base lower portion and/or base upper portion. In examples, the thermal isolator may be provided in the base upper portion and/or base lower portion. In examples, the first thermal isolator 404 may be provided in the base upper portion and the electronics may be provided in the base lower portion. In examples, the first thermal isolator 404 may be interposed between or at an interface of the base upper portion and internal space 416. In examples, the first thermal isolator 404 may be arranged to thermally insulate the electronics provided in the base.

In examples, a housing top portion or cap may house the electronics such as the second PCB 414 and second thermal isolator 412. In examples, the housing top portion or cap may be as previously described. In examples, although not illustrated, the top portion or cap may include a cap upper portion and a cap lower portion. In examples, the electronics may be located in the cap upper portion and/or cap lower portion. In examples, the second thermal isolator 412 may be located in the cap upper portion and/or cap lower portion. In examples, the electronics may be provided in the cap upper portion and the second thermal isolator may be provided in the cap lower portion. In examples, the second thermal isolator 412 may be interposed between or at an interface of the cap lower portion and internal space 416. In examples, the second thermal isolator can thermally insulate the electronics provided in the top portion or cap of sensor system housing.

In examples, as illustrated in FIG. 4, one or more heaters 418 may be provided on a portion of rotatable assembly 406. In examples, rotatable assembly 406 may include one or more hollow regions 420. In examples, a hollow region 420 may improve heat circulation and thus convection. In examples, a hollow region 420 may be configured to house components of the sensor system such as electronics, including for example, the emitter and receiver electronics. In examples, a hollow region 420 may house one or more sensor system components and improve heat circulation. In examples, rotatable assembly 406 may be configured to promote and/or enhance heat distribution within internal space 416 as it rotates about spindle 408. In examples, the one or more heaters 418 may be located at a rotating portion of rotatable assembly 406. In examples, a heater 418 may be located anywhere on rotatable assembly 406 and/or spindle 408. As illustrated, rotatable assembly 406 may include one or more protrusions 424 and 428 such as fins, vanes, wings, or other protruding portions. In examples, protrusions 424 and 428 may extent radially or axially from a center portion 432 of rotatable assembly 406 and/or from spindle 408. As illustrated, a first heater 418a may be provided on an outer edge 422 of a first protrusion 424 of rotatable assembly 406. In examples, a second heater 418b may be provide on an outer edge 426 of a second protrusion 428 of rotatable assembly 406. In examples, as illustrated, one or more heaters 418 may be arranged to be closest to an inner surface 428 of lens system/window 410. In examples, as heater(s) 418 radiate heat, the rotation of rotatable assembly 406 about spindle 408 may cause heat to assume a circular rotation 430 parallel to lens system/window 410, a housing base, and/or a housing top portion or cap. In examples, as rotatable assembly 406 rotates, heat flow may be turbulent. In examples, as rotatable assembly 406 rotates, heat flow may assume a vertical circular flow path with heat moving towards a housing base and a housing top portion or cap. In examples, any combination of different flows may be achieved.

In examples, the housing base may contain one or more additional heaters as described earlier in conjunction with FIG. 3. In examples, the housing top portion or cap may contain one or more heaters as previously described. Adding heaters to the housing base and/or top portion or cap can provide additional heat radiation inside internal space 416. In examples, rotatable assembly 406 may further include one or more protrusions such as extensions or wings to further promote heat circulation as also previously discussed in conjunction with FIG. 3.

In examples, to further promote heat circulation within an internal space of a sensor system housing, a fan may be employed. In examples, a fan may be computer fan. In examples, a fan may be provided in the housing base or a housing top portion or cap. In examples, a vent may be provided at the surface of the base or top portion or cap interfacing with the internal space of the sensor system housing. In examples, when the fan is activated it can cause air within the internal space of the sensor system housing to circulate. The air circulation can cause heat to also distribute within the internal space of the sensor system housing and thus improve heat convection. In examples, a fan may be helpful in promoting heat convention in solid-state sensor systems. Implementation of a fan in a housing for a solid-state sensor system is described in conjunction with FIG. 6 below. It should be recognized that similar fan arrangement and/or configuration may be provided for a mechanical sensor system described in FIGS. 3 and 4.

Figure 5A:
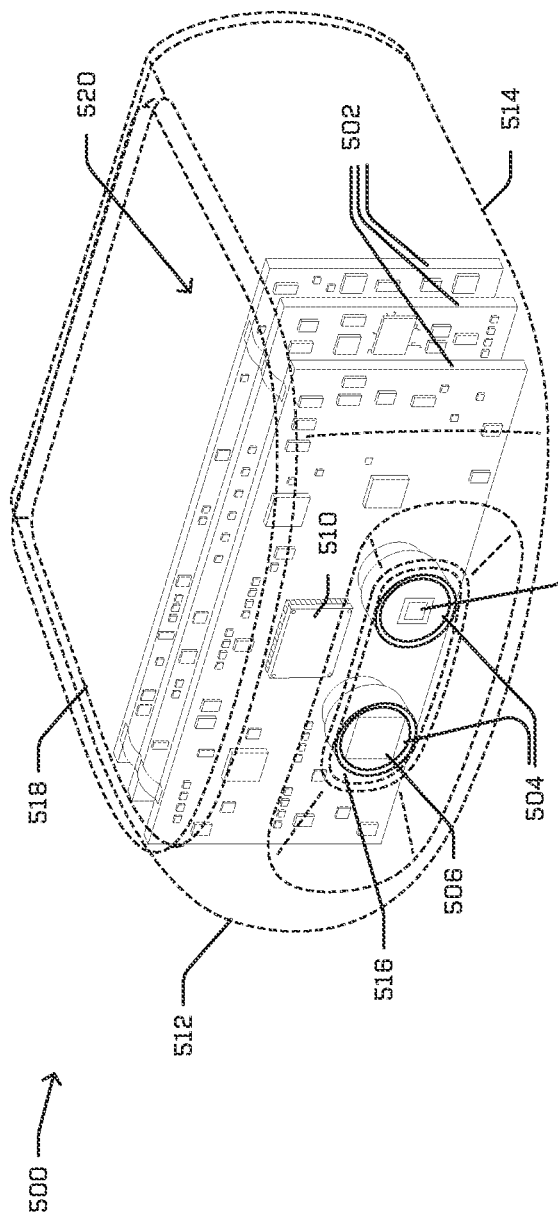
FIGS. 5A-5C illustrate a diagram of examples of an encased solid-state lidar system with one or more heaters for defogging and/or defrosting the hosing window.
Figure 5C:
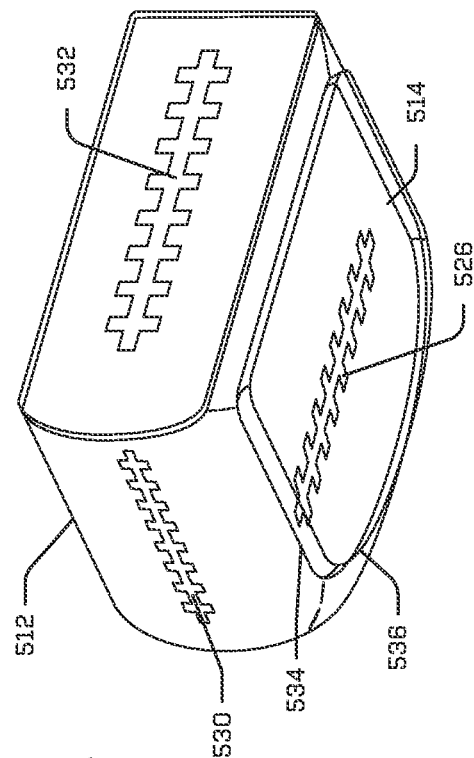
Figure 5B:
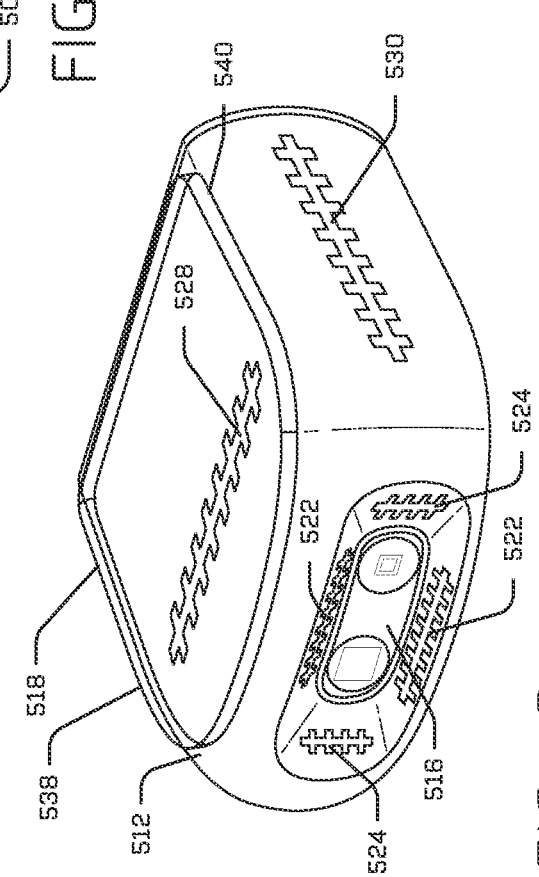

FIGS. 5A-5C illustrate a diagram of an example of an encased solid-state lidar system 500. In examples, a solid-state lidar system 500 may include one or more printed circuit boards 502 interconnected to each other. Solid-state lidar system 500 may include a lens system 504. In examples, solid-state lidar system 500 may include a photosensor 506. In examples, solid-state lidar system 500 may include a transmitter or light emitter 508, such as for example a laser diode. In examples, solid-state lidar system 500 may include a processor 510. In examples, solid-state lidar system 500 may also include a power source (not shown) connected to the vehicle onto which the solid-state lidar system 500 is installed. In examples, solid-state lidar system may be encased in a housing 512. As described earlier, housing 512 may include a base 514, a window 516, and a top portion or cap 518. In examples, since solid-state lidar system 500 is stationary, window 516 of housing 512 may be located only on one side of housing 512. In examples, window 516 is provide to correspond to the location of the lens system 504 of solid-state lidar system 500 so as to allow for the transmission of electromagnetic waves or emissions in the visible and/or infrared spectrum so that they can be transmitted and received by the solid-state lidar system 500. In examples, as illustrated, housing 512 defines an internal space 520 within which at least a portion of the solid-state lidar system 500 is housed. In examples, at least a portion of boundary of internal space 520 may be defined by window 516. In examples, solid-state lidar system 500 does not completely fill internal space 520. In examples, internal space 520 is a sealed space. In examples, housing 512 is configured to prevent any moisture or fluid flow in or out of the internal space 520. In examples, housing 512 may be configured to allow for pressure equalization of internal space 520.

In examples, the air enclosed in the internal space defined by a housing enclosing a sensor system, for example the previously described internal space 520, may contain moisture. In examples, the moisture present inside the housing may cause the inner surface of the window of the housing to fog. In examples, the moisture present outside the housing may cause the outer surface of the window of the housing to fog. In examples, a cold temperature and moisture in the environment around and/or outside the sensor system housing may cause frost to form over an outer surface of the window.

As previously stated, for purposes of this description, the inner surface of a housing window refers to the surface of the window that interfaces with the inside space of the sensor system housing. Consequently, the outer surface of a housing window refers to the surface of the window that interfaces with the environment surrounding the sensor system housing.

In examples, as previously described, the window of a sensor system housing may be configured to allow transmission of electromagnetic waves or emissions. In examples, the window may be configured to allow transmission of electromagnetic waves or emissions without distortion or attenuation. In examples, fogging and/or frosting of the window may interfere with the transmission of electromagnetic waves or emissions by inducing distortion and/or attenuation and thus with the proper functioning of the sensor system.

In examples, heat may be employed to defog and/or defrost the window of the sensor system housing. In examples, as shown in FIGS. 5B and 5C, one or more heaters may be provided in the sensor system housing, a sensor system component, or any combination thereof.

In examples, as previously described, a heater may include a type of device able to radiate heat. In examples, a heater may include a resistance heater, a heat exchanger, or any like structure. In examples, as described herein, a heater can include a resistance heater. A resistance heater may include resistor configured to convert electrical energy to heat energy. In examples, a resistance heater is configured to heat when electricity or electrical current flows through it. Any suitable material may be used to form a resistance heater. In examples, a resistance heater can include a metal or metal alloy, a ceramic, a semiconductor, a polymer, or any combination thereof. In examples, a resistance heater may include a metal such as nickel, chromium, iron, copper, or aluminum, metal alloy such as nichrome (for example 80/20 nickel-chromium alloy), iron chromium aluminum alloy, copper nickel alloy, a ceramic or semiconductor material such as molybdenum disilicide, silicon carbide, positive thermal coefficient (PTC) ceramic such as barium titanate or lead titanate composites, quartz halogen, or any combination thereof. In examples, a heater may include any suitable shape. In examples, a heater may be circular, oval, quadrilateral, oblong, triangular, or any have any regular or irregular shape.

In examples, one or more heaters as described below may be implemented alone or in combination. In examples, one or more heaters may be configured to cause heating of at least a portion of the housing window, at least a portion of an inner or outer surface of the housing window, and/or at least a portion of the housing window surrounding area.

In examples, one or more heaters may be provided adjacent to and/or proximate to the housing window. In examples the heaters may be located at an outer surface of the sensor system housing. In examples the heaters may be located at an inner surface of the sensor system housing. In examples the heaters may be located at both an outer surface and an inner surface of the sensor system housing. For example, as illustrated in FIG. 5B, one or more heaters 522 and/or 524, may be provided at a portion of the sensor housing, proximate to and/or adjacent to the window. In examples, as shown in FIG. 5A, if the housing includes a window extending only on one or fewer than all sides, then one or more window top and/or bottom heaters 522, and/or window side heaters 524 may be placed adjacent and/or proximate to one or more sides of the window 516. In examples, one or more heaters 522 and/or 524 may be provided at a periphery of the housing window. In examples, by radiating heat at or in proximity to the window, it may be possible to heat the window and/or window surrounding areas inside and/or outside of the housing sufficiently to promote defogging of the window and/or defrosting the window.

In examples, one or more heaters may be provided internal to sensor system housing. In examples, where the heaters are internal to the housing, the heat radiated may be more efficiently and effectively utilized to help defog and/or defrost the window.

In examples, as shown in FIGS. 5B and 5C, one or more heaters may be provided at the top, side, or base of the sensor system housing. In examples, one or more cap heaters 528 may be located at a top portion or cap of the sensor system housing. In examples, as shown in FIG. 5B, the top portion or cap 518 of the sensor system housing 512 may include an upper portion 538 and a lower portion 540 and one or more cap heaters 528 may be located in the upper portion and/or lower portion of the top portion or cap 518. In examples, as shown in FIG. 5B, one or more cap heaters 528 may be located in a lower portion of the top portion or cap 518 of the sensor system housing at a location near, proximate, or at the interface between the base of the sensor system housing and the internal space 520. In examples, one or more base heaters 526 may be located at a base of the sensor system housing. In examples, as shown in FIG. 5C, the base heaters 526 may be near, proximate, or at the internal surface of the base of the sensor system housing interfacing with the internal space 520 as previously described. In examples, the base of the sensor system housing may include an upper portion 534 and a lower portion 536 and one or more heaters 526 may be located in the upper portion and/or lower portion of the base. In examples, as shown in FIG. 5C, one or more base heaters 526 may be located in an upper portion of the base of the sensor system housing at a location near, proximate, or at the interface between the base of the sensor system housing and the internal space 520.

In examples, heaters 526, and/or 528 may be provided adjacent to and/or proximate to the window. In examples, one or more base heaters 526 may be located in an upper portion of the base of the sensor system housing that may be in contact with and/or proximate to the window 516 and may be configured to conductively transfer heat from the one or more heaters 526 to the window 516. In examples, one or more cap heaters 528 may be located in a lower portion of the top portion or cap of the sensor system housing that may be in contact with and/or proximate to the window 516 and may be configured to conductively transfer heat from the one or more heaters 528 to the window 516. In examples, heaters 526, and/or 528 may be provided closer to a central and/or internal portion of the sensor system housing. In examples, one or more side heaters 530 may be located on one or more sides of the sensor system housing 512. In examples, one or more side heaters 530 may be located in a inner portion of one or more sides of the sensor system housing 512 that may be in contact with and/or proximate to the window 516 and may be configured to conductively transfer heat from the one or more heaters 530 to the window 516. In examples, one or more rear heaters 532 may be located at a rear portion of sensor system housing 512.

In examples, one or more heaters may be provided on one or more components of the sensor system enclosed in the sensor system housing. In examples, one or more heaters (not shown) may be provided on a solid-state sensor system. In examples, one or more heat sinks and/or heat barriers may be employed to protect a PCB, or other electronics from overheating due to one or more heaters being present.

In examples, the housing window 516 may include one or more inductive heaters or heating elements. In examples, a heating filament, coating, pattern or like heat inductor may be provided in at least a portion of the housing window. In examples, the heating filament, coating, or pattern may include an electrically conductive material provided on at least a portion of a surface of and/or within the thickness of housing window 516. In examples, a heater or heating element incorporated in the housing window 516 may be configured to not interfere with the transmission of the electromagnetic waves or emissions transmitted and received by the sensor system.

In examples, as stated earlier, convection heating inside the sensor system housing may be employed to defog and/or defrost the sensor system housing window. In examples, convention heating may be used to cause heating of at least a portion of the housing window, at least portion of an inner or outer surface of the housing window, and/or at least a portion of the housing window surrounding area. In examples, convection heating may be promoted and/or enhanced by causing heat radiated into a sensor system housing to circulate within the internal space defined by the sensor system housing. In examples, as described in more detail below, circulation of heat within the sensor system housing may be promoted by one or more fans.

Figure 6:
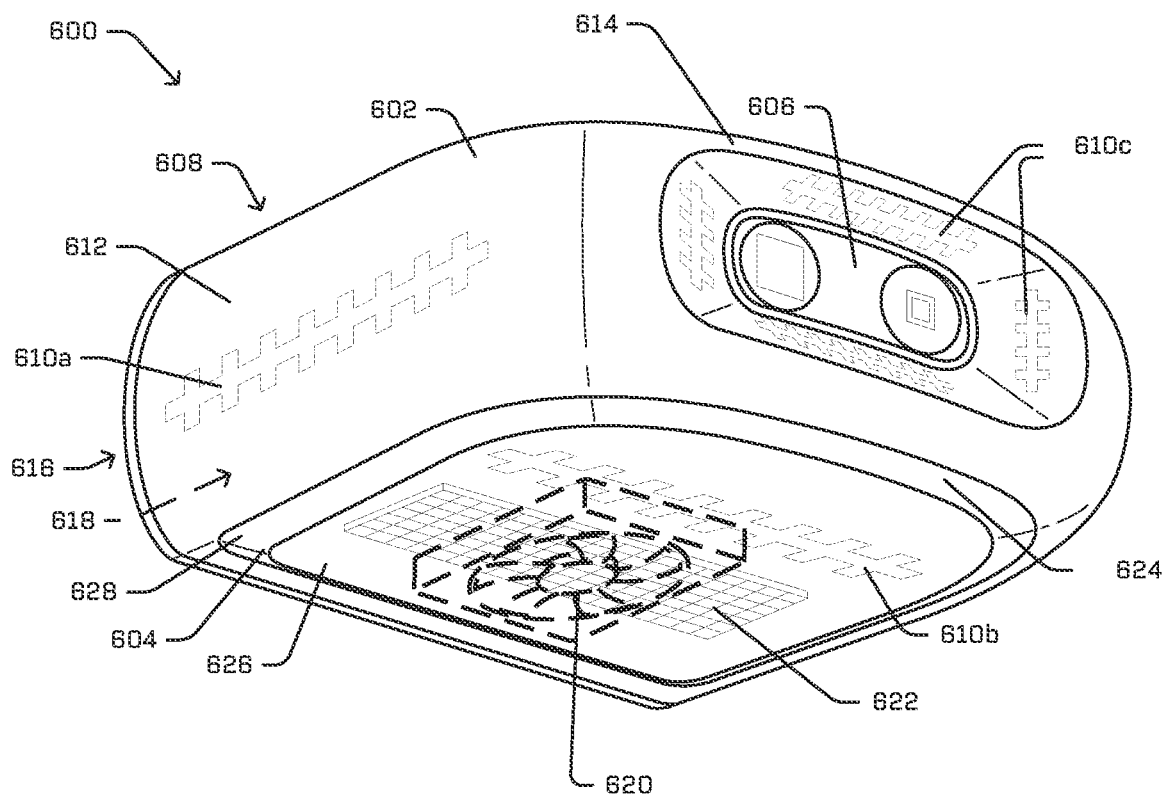
FIG. 6 illustrates a sensor system enclosed in a housing and configured to implement convection heating to defog and/or defrost a transmission window using a fan.

FIG. 6 illustrates an example of a solid-state sensor system enclosed in a housing and configured to implement convection heating to defog and/or defrost a transmission window. Illustrated is a solid-state sensor system 600. In examples, system 600 may be a solid-state lidar system. Sensor system 600 may include electronics as previously described. In examples, the electronics may include one or more PCB boards that include one or more integrated circuit electronics such as for example a processor, emitter/transmitter, photosensor, and a lens system. In examples, the electronics may include one or more additional printed circuit boards (PCB), one or more processors, memory, capacitors, other electronics to control operation of the sensor, or any combination thereof. In examples, the sensor system 600 may include a housing 602 including a base 604, a window 606, and top portion or cap 608. In examples, the window 606 may be aligned with the lens system to allow for the transmission of electromagnetic waves or emissions to and from the integrated circuit components on PCB boards and/or other electronics.

In examples, one or more heaters 610 may be provided in housing 602. Illustrated, heaters 610a, 610b, 610c may be located on the side 612, base 604, and/or front portion 614 of housing 602. This is an example. One or more heaters may be located on top portion or cap 608. One or more heaters 610 may be located at base 604, top portion or cap 608, side 612 of housing 602, a front portion 614 of housing 602, and/or back portion 616 of housing 602. In examples, the heaters 610 may include resistance heaters.

In examples, housing 602 may define an internal space 618. In examples, at least a portion of a boundary of internal space 618 may be defined by window 606. In examples, internal space 618 may encase at least a portion of the sensor system 600. In examples, the internal space 618 may be a sealed space. In examples, the housing 602 may be configured to allow for pressure equalization of a sealed internal space 618. To promote heat circulation within internal space 618, sensor system 600 may include one or more fans 620.

In examples, the internal space 618 may encase one or more electronics of sensor system 600. In examples, at least a portion of the electronics may be located in base 604 and/or top portion or cap 608.

In examples, the base 604 may include an upper portion 624 and lower portion 626 as previously described. In examples, not illustrated, top portion or cap 608 may similarly include an upper portion and a lower portion as previously described. In examples, one or more heaters 610 may be located on the upper portion and/or lower portion of the base 604 and/or top portion or cap 608. In examples, at least a portion of the electronics may be located in an lower portion of base 604 or upper portion of top portion or cap 608, and one or more heaters 610 may be located in an upper portion of base 604 and/or lower portion of top portion or cap 608. In examples, one or more thermal isolators separating the upper portion from the lower portion of the base 604 and/or top portion or cap 608 as previously described for a mechanical sensor system.

In examples, one or more fans 620 may be configured to circulate air within internal space 618 to promote convection heating of window 606. In examples, a fan 620 may be computer fan or similar structure. In examples, a fan 620 may be operated at the same time or at different times than a heater 610.

In examples, one or more fans 620 may be located inside internal space 618. In examples, one or more fans 620 may be provided together with or separately from any of the electronics of the sensor system 600.

In examples, a fan 620 may be separated from the electronics. For example, as illustrated in FIG. 6, one or more fans 620 may be provided inside the base 604 of housing 602 separated from the electronics by a separator such as an internal top surface 628 of upper portion 624 of base 604 but in flow communication with the rest of internal space 618 to enhance and/or promote convection heating of window 606. In examples, the flow communication may be enabled via one or more vents 622 provided at internal top surface 628. In examples, one or more heaters 610b may be provided at the internal top surface 628 of base 604 along with one or more vents 622. Similarly, one or more fans 620 and vents 622 may be provided at top portion or cap 608 of a housing 602. In examples, one or more fans 620 and vents 622 may be provided at one or more sides 612 of housing 602 in a similar manner. In examples, one or more fans 620 and vents 622 may be provided at a front portion 614 and/or a back portion 616 of housing 602 in a similar manner. It should be understood that one or more fans 620 and vents 622 may be provided in any combination of base, top portion or cap, sides, front, and/or back of housing 602 with or without a separator like internal top surface 628. In examples, one or more fans 620 may be provided and configured to blow air directly against an internal surface of window 606.

In examples, the one or more fans 620 do not inject air from outside housing 602 into internal space 618. In examples, one or more fans 620 may be sealed inside housing 602 and/or internal space 618. In examples, one or more fans 620 may be configured to circulate air within internal space 618 while internal space 618 remains a sealed space.

In examples, although not shown, one or more thermal isolators as previously discussed may be provided between at least a portion of one or more sensor system electronics (e.g. PCBs) and a heater 610 to protect the electronics from the heat radiation from one or more heaters 610.

Figure 7:
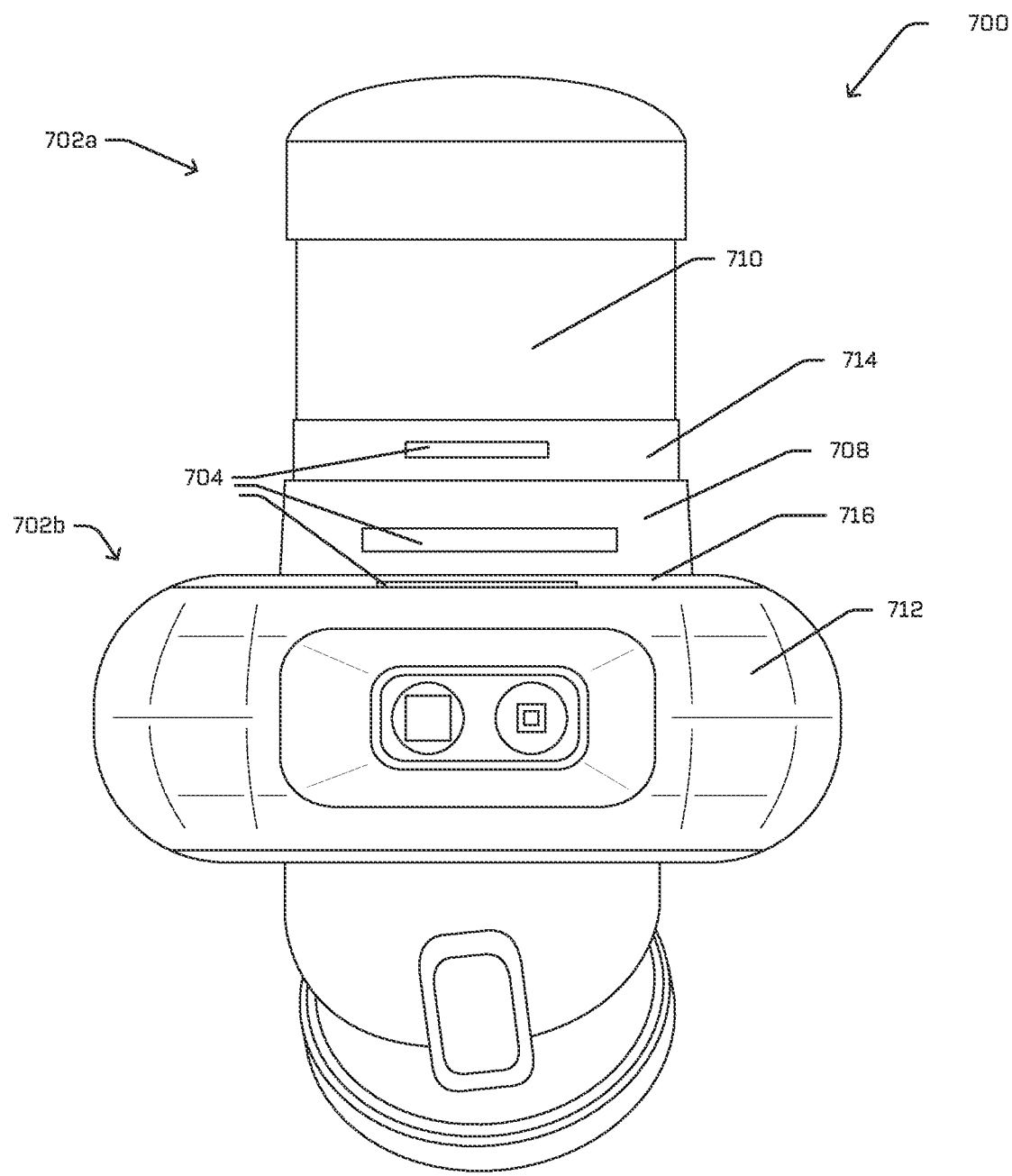
FIG. 7 illustrates an example of a sensor system pod.

In examples, as shown in FIG. 7, in examples, two or more sensor systems may be combined into a sensor system pod 700 as discussed briefly with reference to FIG. 1. As illustrated, sensor system pod 700 may include one or more first sensor system 702a and one or more second sensor system 702b. In examples, a sensor system pod 700 may include one or more heaters 704 configure to heat a first sensor system 702a and/or a second sensor system 702b. In examples, one or more heaters 704 can be shared heaters that provide heat to both a first sensor system 702a and a second sensor system 702b.

In examples, one or more first senor system 702a may include one or more mechanical sensors, one or more solid state sensors, or any combination thereof. In examples, one or more second senor system 702b may include one or more mechanical sensors, one or more solid state sensors, or any combination thereof. In examples, a mechanical sensor may include a mechanical lidar system as described herein. In examples, a solid state sensor may include a solid state lidar system as described herein. In examples, as illustrated, sensor system pod 700 may include at least a first sensor system 702a including a mechanical sensor system, such as a mechanical lidar system, and at least a second sensor system 702b including a solid state sensor system, such as a solid state lidar system.

In examples, a shared heater 704 may be located between a first sensor system 702a and a second sensor system 702b. In examples, a shared heater 704 may be located at a base 714 of a sensor system housing of a first sensor system 702a located above a second sensor system 702b. In examples, a shared heater 704 may be located in the top portion or cap 716 of a sensor system housing of a second system 702b located underneath a first sensor system 702a. In examples, a first sensor system 702a and second sensor system 702b may share a sensor system pod housing 706. In examples, a shared sensor system pod housing 706 may include an intermediate housing portion 708 provided between a first sensor system 702a and a second sensor system 702b. In examples, a sensor system pod housing 706 may defined a sealed space enclosing a first sensor system 702a, a second sensor system 702b, or both. In examples, the housing 706 may be configured to allow for pressure equalization of a sealed internal space enclosing a first sensor system 702a, a second sensor system 702b, or both. In examples, a first sensor system 702a and a second sensor system 702b may be enclosed in a separate sealed spaces 710 and 712 respectively. In examples, the housing 706 may be configured to allow for independent and/or joint pressure equalization of a sealed internal spaces 710 and 712. In examples, a first sensor system 702a and a second sensor system 702b may be enclosed in a shared sealed space including joined sealed spaces 710 and 712. In examples, one or more shared heaters 704 may be located in a portion of intermediate housing portion 708.

In examples, one sensor system of the sensor system pod 700 may act as a heating source to another sensor system of the sensor system pod 700. In examples, a first sensor system 702a may include one or more heaters 704. In examples, as a first sensor system 702a is heated, it may be configured to transfer at least a portion of the heat to a second sensor system 702b. Likewise, in examples, a second sensor system 702b may include one or more heaters 704. In examples, as a second sensor system 702b is heated, it may be configured to transfer at least a portion of the heat to a first sensor system 702a.

In examples, a first sensor system 702a and a second sensor system 702b of sensor system pod 700 may be operated together or independently. In examples, heating of a first sensor system 702a and a second sensor system 702b of sensor system pod 700 may be applied together or independently.

In examples, the operation of one or more heaters and, if present, one or more fans may be controlled by a vehicle control system 800 and/or an independent controller 106. In examples, control of one or more heaters, and if present, one or more fans may be based on a determined or predicted state of the housing transmission window. Control of heaters and/or fans as described may include activation, deactivation, and/or adjustment of intensity level. In examples, the intensity level of a heater may be adjusted by controlling the amount of current flowing through the heater. Other means to control intensity may also be employed. In examples, intensity level of a fan may be controlled based on the speed at which the fan blades are spun and/or based on the force at which the fan blows air.

In examples, one or more means to detect or predict fogging and/or frosting of a housing transmission window can be implemented. In examples, if fogging and/or frosting is detected and/or predicted, then one or more heaters and, if present, one or more fans may be activated and/or their intensity level adjusted. In examples, if fogging and/or frosting has been addressed or extinguished, then one or more heaters and, if present, one or more fans may be deactivated and/or their intensity level adjusted.

In examples, control of heaters and fans, if present, may be triggered based on a sensed determination that fogging and/or frosting is present or absent. Any sensor capable of detecting fogging and/or frosting of the housing window may be implemented. In examples, one or more sensors can be provided in sensor system housing, as one or more components of the sensor system, including one or more integrated circuits, or any combination thereof. Sensor may include optical sensors, moisture sensors, resistance sensors or any like sensor that is capable of determining fogging and/or frosting is present. In examples, a sensor may determine a status of the transmission window conditions. In examples, a moisture sensor may determine whether moisture is present at a surface of the transmission window. In examples, the moisture sensor can detect moisture based on an electrical resistance measured at a surface of the window. In examples, a sensor may determine the level of transparency of the housing window to determine whether fogging and/or frosting is present. In examples, a sensor may detect presence and/or a minimal threshold degree of attenuation and/or distortion to the transmission of emitted waves or emissions through the window to determine whether fogging and/or frosting is present. In examples, the sensor system encased in the sensor system housing may indicate if fogging and/or frosting is present. In examples, if the sensor system is a lidar system, the level of detection by the lidar system may be correlated to the transmission clarity of the housing window. In examples, if the resolution of the lidar system falls below a given threshold, then the system and/or independent controller may determine that the housing window is fogged and/or frosted.

In examples, control of heaters and fans, if present, may be triggered by a prediction that fogging and/or frosting may be present or absent based on environmental conditions. Environmental conductions may include temperature, moisture content, pressure, due point or any combination thereof. For examples, in examples, fogging and/or frosting may be anticipated or predicted or determined to be present or absent based at least in part on environmental temperature inside sensor system housing, outside sensor system housing, or both. In examples, fogging and/or frosting may be anticipated or predicted or determined to be present or absent based at least in part on moisture content inside sensor system housing, outside sensor system housing, or both. In examples, fogging and/or frosting may be anticipated or predicted or determined to be present or absent based at least in part on the barometric pressure inside sensor system housing, outside sensor system housing, or both. In examples, fogging and/or frosting may be anticipated or predicted or determined to be present or absent based at least in part on due point calculation inside and/or outside sensor system housing.

Figure 8:
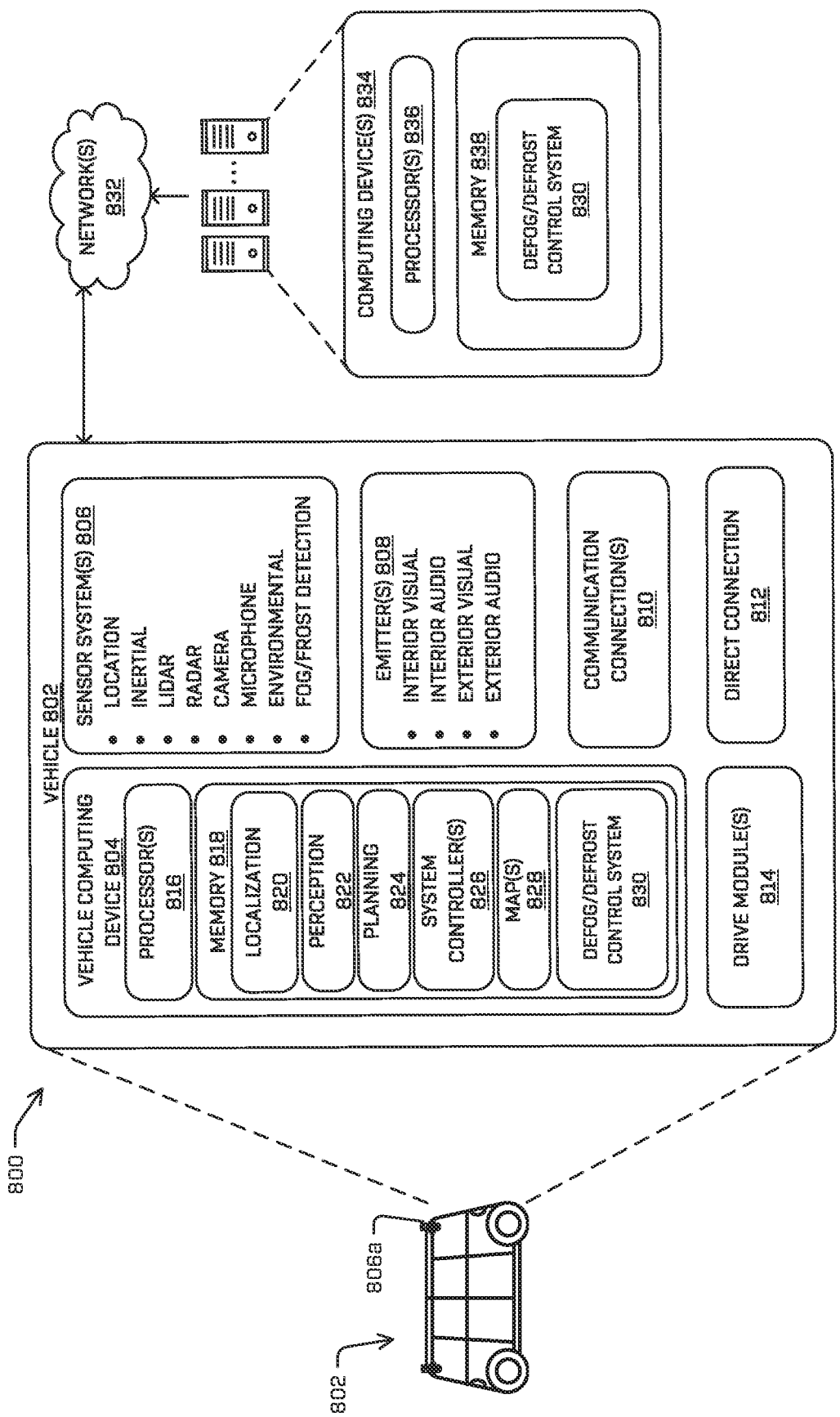
FIG. 8 depicts a block diagram of an example control system of a vehicle.

FIG. 8 depicts a block diagram of an example control system 800 of vehicle 802. In at least some examples, the system 800 may include a vehicle 802, which may correspond to the example vehicle 100. In examples, controller 106 discussed previously may work independently of and/or in concert with system 800. In examples, controller 106 may be integrated into system 800 as control system 830 described herein. The vehicle 802 may include a vehicle computing device 804, one or more sensor system(s) 806, one or more of which implemented as a sensor system 806a as described herein, one or more emitters 808, one or more communication connections 810, at least one direct connection 812, and one or more drive modules 814.

The vehicle computing device 804 may include one or more processors 816 and memory 818 communicatively coupled with the one or more processors 816. In the illustrated example, the vehicle 802 is an autonomous vehicle. However, the vehicle 802 may be any other type of vehicle. In the illustrated example, the memory 818 of the vehicle computing device 804 stores a localization component 820, a perception component 822, a planning component 824, a defog/defrost control system 830, one or more system controllers 826, and one or more map(s) 828. Though depicted in FIG. 8 as residing in memory 818 for illustrative purposes, it is contemplated that the localization component 820, the perception component 822, the planning component 824, the defog/defrost control system 830, the one or more system controllers 826, and the one or more maps 828 may additionally, or alternatively, be accessible to the vehicle 802 (e.g., stored on, or otherwise accessible by, memory remote from the vehicle 802).

Regarding the example system 800 shown in FIG. 8, in at least some examples, the localization component 820 may be configured to receive data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment and may continuously determine a location and/or orientation of the autonomous vehicle within the map. In some examples, the localization component 820 may utilize SLAM (simultaneous localization and mapping), CLAMS (calibration, localization and mapping, simultaneously), relative SLAM, bundle adjustment, non-linear least squares optimization, or the like to receive image data, lidar system data, radar data, IMU data, GPS data, wheel encoder data, and the like to accurately determine a location of the autonomous vehicle. In some examples, the localization component 820 may provide data to various components of the vehicle 802 to determine an initial position of an autonomous vehicle for generating a candidate trajectory, as discussed herein.

In some examples, the perception component 822 may be configured to perform object detection, segmentation, and/or classification. In some examples, the perception component 822 may provide processed sensor data that indicates a presence of an entity that is proximate to the vehicle 802 and/or a classification of the entity as an entity type (e.g., car, pedestrian, cyclist, animal, building, tree, road surface, curb, sidewalk, unknown, etc.). In additional and/or alternative examples, the perception component 822 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 824 may determine a path for the vehicle 802 to follow to traverse through an environment. For example, the planning component 824 may determine various routes and trajectories and various levels of detail. For example, the planning component 824 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 824 may generate an instruction for guiding the autonomous vehicle along at least a portion of the route from the first location to the second location. In at least one example, the planning component 824 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 802 to navigate.

In at least one example, the planning component 824 may determine a location of a user based on image data of an environment received from the user using, for example, bags of binary words with image-based features, artificial neural network, and the like. Further, the planning component 824 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 802 may stop to pick up a passenger. In at least one example, the planning component 824 may determine a pickup location based at least in part on determining a user identity (e.g., determined via image recognition or received as an indication from a user device, as discussed herein).

In other examples, the planning component 824 may alternatively, or additionally, use data from the perception component 822 to determine a path for the vehicle 802 to follow to traverse through an environment. For example, the planning component 824 may receive data from the perception component 822 regarding objects associated with an environment. Using this data, the planning component 824 may determine a route to travel from a first location (e.g., a current location) to a second location (e.g., a target location) to avoid objects in an environment. In at least some examples, such a planning component 824 may determine there is no such collision free path and, in turn, provide a path which brings vehicle 802 to a safe stop avoiding all collisions and/or otherwise mitigating damage. In examples, in conjunction with bringing vehicle 802 to a safe stop and/or mitigating damage in the event of a collision or predicted collision, planning component 824 can generate a trigger signal for one or more occupant protection systems.

In examples, a defog/defrost control system 830 may be used to control one or more heaters and, if present, fans in one or more sensor systems 806a as previously described. In examples, defog/defrost control system 830 may be in place of and/or in conjunction with a separate controller 106 provided at one or more sensor system 806a as previously described. In examples, defog/defrost control system 830 and/or one or more controllers 106 may be in communication with one or more sensor systems 806a either via wired connection, wirelessly, or a combination thereof. In examples, the defog/defrost control system and/or controller 106 may engage one or more heaters and, if present, fans when vehicle 802 is first started and/or during operation. In examples, defog/defrost control system 830 and/or controller 106 may trigger activation and/or adjustment in operation of the sensor system or portion thereof.

In examples, defog/defrost control system 830 and/or controller 106 may receive information from one or more other components or sensors of system 800. In examples, defog/defrost control system 830 and/or controller 106 may receive one or more signals from sensors and/or other components of system 800 indicative of presence of fogging and/or frosting on a sensor system housing window or of information from which a prediction can be made as to whether fogging and/or frosting on a sensor system housing window may be present. In examples, the one or more signals indicative of fogging and/or frosting or from which a prediction can be made about fogging and/or frosting may be received at the time the vehicle is first started, at the time a sensor system is first activated, during operation of the vehicle, during operation of the sensor system, while operation of the sensor system is suspended, or any combination thereof.

In examples, the presence of fogging and/or frosting may be detected optically, electrically, or a combination thereof using one or more fog and/or frost detection sensors of sensor system 806 and/or from the reading quality and/or resolution of a sensor of sensor system 806 that is encased into a sensor system housing. In examples, the presence of fogging and/or frosting may be predicted based on information detected by one or more environmental sensors that may include one of temperature conditions, moisture level, pressure, or any combination thereof inside and/or outside a sensor system housing of a sensor system 806a. In examples, any combination of information detected by one or more fog and/or frost detection sensors of sensor system 806, detection quality and/or resolution of a sensor of sensor system 806 that is encased into a sensor system housing, and environmental sensors of sensor system 806 may be collected to determine and/or predict fog and/or frost being present at one or more system sensor housing windows.

In examples, each the fogging and/or frosting conditions of the window of each sensor system housing may be detected or predicted separately. In examples, the fogging and/or defrosting of the windows in two or more sensor system housings may be determined or predicted together.

In examples, based on the detection and/or prediction of fogging and/or frosting being present, the defog/defrost control system 830 and/or controller 106 may trigger the control of one or more heaters and, if present, fans to cause heat to be radiated and circulated inside one or more sensor system housings as previously described. In examples, the control of one or more heaters and, if present, fans in each sensor system may be performed independently. In examples, the control of one or more heaters and, if present, fans in two or more system sensors may be performed simultaneously based on a common determination and/or prediction.

In examples, in addition to controlling of one or more heaters and, if present, fans, based on the detection and/or prediction of fogging and/or frosting being present, the defog/defrost control system 830 and/or controller 106 may cause activation and/or adjustment in operation of the sensor system or portion thereof. In examples, defog/defrost control system 830 and/or controller 106 may have direct control over the sensor system or components thereof. In examples, defog/defrost control system 830 and/or controller 106 may communicate with one or more other components of system 800 to cause activation and/or adjustment in operation of a sensor system or portions thereof. For example, for a mechanical sensor, defog/defrost control system 830 and/or controller 106 may directly trigger or cause triggering of the sensor system motor to rotate the spindle and thus of the rotatable assembly at a rate that may be higher or lower than the rotational speed during normal sensor operations to promote heat convection. In examples, the defog/defrost control system 830 and/or controller 106 may directly trigger or cause triggering of the sensor system motor to activate while the sensor system electronics are not transmitting or receiving electromagnetic waves or emissions. For example, defog/defrost control system 830 and/or controller 106 may control the sensor system motor based on a determined rotational speed for the rotatable assembly to induce a certain speed, level, direction, and/or nature of air circulation inside the sensor system housing to distribute heat to defog and/or defrost the housing window. In examples, the sensor system motor may be controlled to achieve a rotational speed that may be set to induce laminar air flow or turbulent air flow inside the inner space of the sensor system housing. In examples, the rotation of the rotatable assembly as adjusted by controlling the sensor system motor may not be compatible with the functioning of the sensor system transmission and reception of electromagnetic waves. Accordingly, in examples, the sensor system motor may be controlled to rotate the rotatable assembly, at least temporarily, at a speed that may promote a desired heat convention while the sensing functionality of the sensor system is suspended. In examples, the rotation of the rotatable assembly may be adjusted to a multiple of a nominal rotational speed to enable the sensor system to be operate in a nominal fashion. For example, the rotatable assembly may rotate at two times the nominal rate with sensor readings captured on alternating rotations. In some examples, a correction factor may be applied to the sensor system to account for changes in rotational speed.

In examples, defog/defrost control system 830 and/or controller 106, or in the alternative an independent sensor system controller may be configured to minimize or prevent overheating of the electronics of the sensor system. In examples, control system 830 and/or controller 106, or in the alternative an independent sensor system controller may be configured to suspend or reduce the sensing operation of the sensor system by deactivation and/or reduced operation of one or more sensor system electronics, such as PCB, or portion thereof when their temperature reaches a threshold. In examples, one or more integrated circuit components that are part of the sensor system electronics may include an monitor, probe, or like element that can detect the temperature of the integrated circuit component or of the PCB as a whole. In examples, the system may be designed to suspend or reduce the sensing operation of the sensor system by deactivating and/or reducing operation of an integrated circuit component and/or the PCB as a whole when the temperature exceeds the threshold. Reduction in operation of an integrated circuit component and/or of the PCB or other sensor system electronics may include reducing the amount of computing resources required to operate sensors and/or operate processors and/or reducing processing time, memory usage, or computing processes. In examples, deactivation or reduced operation of a sensor system electronics and/or portion thereof to prevent overheating may also be based on additional information such as a state of the vehicle so that the safety of the vehicle is not jeopardized by the deactivation or reduced operation of the sensor system. For example, when the vehicle is stopped, traveling in a direction opposite from where the sensor system is sensing information, or traveling in a rural area with very few or no other vehicles or pedestrians around, the sensor system electronics or one or more integrated circuit components therein might be deactivated or their operation reduced to avoid overheating when the temperature of the electronics or one or more integrated circuit components therein is at or exceeds a first threshold. On the other hand, in examples, when the vehicle is traveling in the direction in which the sensor system is detecting and/or traveling through an environment with moving objects and pedestrian around the vehicle, the deactivation and/or reduced operation of the electronics or one or more integrated circuit components therein may be triggered based on the temperature of the electronics or one or more integrated circuit components therein being at or exceeding a second threshold that is higher than the first threshold. In examples, deactivation and/or reduction in operation of the sensor system electronics or any portion thereof may be precluded based on the state of the vehicle. In examples, to prevent overheating of the electronics and/or one or more integrated circuit components therein, the one or more heaters in the sensor system may be deactivated or controlled to emit less heat if deactivation of the sensor system electronics and/or any portion thereof is precluded or not possible.

In at least one example, the vehicle computing device 804 may include one or more system controllers 826, which may be configured to control steering, propulsion, braking, safety, emitters, communication, and other systems of the vehicle 802. These system controller(s) 826 may communicate with and/or control corresponding systems of the drive module(s) 814 and/or other components of the vehicle 802.

The memory 818 may further include one or more map(s) 828 that may be used by the vehicle 802 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 828 may include at least one map (e.g., images and/or a mesh). In some examples, the vehicle 802 may be controlled based at least in part on the maps 828. That is, the maps 828 may be used in connection with the localization component 820, the perception component 822, and/or the planning component 824 to determine a location of the vehicle 802, identify objects in an environment, and/or generate routes and/or trajectories to navigate within an environment.

In some examples, the one or more map(s) 828 may be stored on a remote computing device(s) (such as computing device(s) 834) accessible via one or more network(s) 832. In some examples, multiple maps 828 may be stored based on, for example, a characteristic (e.g., type of entity, time of day, day of week, season of the year, etc.). Storing multiple maps 828 may have similar memory requirements but increase the speed at which data in a map may be accessed.

As shown in FIG. 8, in some examples, the logical or control portions of the defog/defrost control system 830 may be stored in the memory 818 of the computing device 804 of the vehicle 802 or remote from the vehicle 802 in the memory 838 of the computing device(s) 834. In some examples, some portions of the defog/defrost control system 830 may be stored in the memory 818 of the computing device 804 of the vehicle 802, and other portions of defog/defrost control system 830 may be stored remotely in the memory 838 of the computing device(s) 834, and the separately located portions of the defog/defrost control system 830 may operate together in a coordinated manner.

In examples, one or more of the sensor system(s) 806 may generate one or more signals indicative of an object (e.g., another vehicle, a wall, a guardrail, a bridge support, a utility pole, and/or a pedestrian) and communicate the one or more signals to the perception component 822 and/or the planning component 824, which may predict a collision with an object in the environment through which the vehicle 802 is travelling and trigger a signal accordingly. In examples, one or more of the sensor system(s) 806 may generate one or more signals indicative of direction of travel, vehicle status (e.g. acceleration, turning, and/or braking), and/or road conditions (e.g. presence and degree of obstacle one or more wheels have to travel over, and/or presence and degree of depression one or more wheels have to travel through), and communicate the one or more signals to the perception component 822, and/or the planning component 824, which may determine an event or predicted event and trigger one or more signals accordingly. In examples, one or more sensor system(s) 806 may generate one or more signals indicative of environmental conditions inside and/or outside of a sensor system housing (e.g. temperature, moisture content, pressure), and/or generate one or more signals indicative of fog and/or frost detection (e.g. optically and/or electrically determine presence of fogging and/or frosting) at one or more housing windows of one or more sensor system housings, and/or generate one or more signals indicative of reading quality and/or resolution of readings captured by one or more sensors 806a of sensor system 806 that is encased in a sensor system housing as previously described, and communicate the one or more signals to the defog/defrost control system 830 and/or one or more controllers 106 and trigger one or more signals to control one or more heaters and, if present, fans provided in one or more sensor systems 806a as previously described.

In some examples, the trigger signal may activate and/or adjust operation of one or more heaters and, if present, fans of one or more sensor systems 806a encased in housings as previously described. In examples, the trigger signal may activate and/or adjust operation of the heaters and, if present, fans for a predetermined amount of time. In examples, to promote heat convention, defog/defrost control system 830 and/or one or more controllers 106 may be configured to activate and/or control operation of the sensor system. For example, when the sensor system is a mechanical sensor system with one or more moving components, defog/defrost control system 830 and/or one or more controllers 106 may activate and/or control operation of the sensor system so that the moving components of the sensor system can cause dispersion of heat within the housing and thus promote heat convention. In examples, the activated heaters and, if present fans may remain activated until a second trigger signal is sent to deactivate. A deactivation and/or adjustment of operation signal may be triggered in a similar manner and based on similar information as the signal that triggered activation and/or adjustment of operation, after the system determines that fogging and/or frosting has been addressed or extinguished. In examples, the deactivation and/or adjustment of operation of the heaters and, if present, fans may be a combination of a time threshold and deactivation and/or adjustment of operation trigger signal. For example, activation of the heaters and, if present, fans may be initially set for a preestablished time period, but a deactivation signal may be triggered if the system detects that the fogging and/or defrosting has been addressed or extinguished before the expiration of the preestablished time period. Similar triggers may be implement to adjust operation of the heaters and, if present, fans, from a first operating condition to a second operating condition. In examples, defog/defrost control system 830 and/or one or more controllers 106 may monitor the temperature inside the sensor system housing and may be configured to trigger deactivation and/or adjustment of operation of at least the heaters if the temperature inside the housing is greater than a predetermined threshold. In this manner, the system may ensure that the sensor system encased in the housing does not overheat. In examples, even though the one or more heaters and, if present, fans may be deactivated and/or their operation adjusted after defogging or defrosting of the housing transmission window, the senor system may remain active.

In some examples, aspects of some or all of the components discussed herein may include any models, algorithms, and/or machine learning algorithms. For example, in some examples, the components in the memory 818 and/or the memory 838 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 806, including one or more encased sensors 806a, may include lidar systems, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 806, including one or more encased sensors 806a, may include multiple examples of each of these or other types of sensors. For example, the lidar systems may include individual lidar systems located at the corners, front, back, sides, and/or top of the vehicle 802. As another example, the camera sensors may include multiple cameras disposed at various locations about the exterior and/or interior of the vehicle 802. The sensor system(s) 806 may provide input to the vehicle computing device 804. Additionally, or alternatively, the sensor system(s) 806 may send sensor data, via the one or more networks 832, to the one or more computing device(s) 834 at a particular frequency, after a lapse of a predetermined period of time, in near real-time, etc.

The vehicle 802 may also include one or more emitters 808 for emitting light and/or sound, as described above. The emitters 808 in this example include interior audio and visual emitters to communicate with passengers of the vehicle 802. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology. In examples, one or more emitters 808 may indicate whether one or more heaters and, if present, fans are active in one or more encased sensor systems 806a.

The vehicle 802 may also include one or more communication connection(s) 810 that enable communication between the vehicle 802 and one or more other local or remote computing device(s). For example, the communication connection(s) 810 may facilitate communication with other local computing device(s) on the vehicle 802 and/or the drive module(s) 814. Also, the communication connection(s) 810 may allow the vehicle 802 to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 may include physical and/or logical interfaces for connecting the vehicle computing device 804 to another computing device or a network, such as network(s) 832. For example, the communications connection(s) 810 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 may include one or more drive modules 814. In some examples, the vehicle 802 may have a single drive module 814. In at least one example, if the vehicle 802 has multiple drive modules 814, individual drive modules 814 may be positioned on opposite ends of the vehicle 802 (e.g., the leading end and the rear, etc.). In at least one example, the drive module(s) 814 may include one or more sensor systems to detect conditions of the drive module(s) 814 and/or the surroundings of the vehicle 802. By way of example and not limitation, the sensor system(s) 806 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar systems, radar sensors, etc. Some sensors, such as the wheel encoders may be unique to the drive module(s) 814. In some cases, the sensor system(s) on the drive module(s) 814 may overlap or supplement corresponding systems of the vehicle 802 (e.g., sensor system(s) 806).

The drive module(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 814 may include a drive module controller, which may receive and preprocess data from the sensor system(s) 806 and to control operation of the various vehicle systems. In some examples, the drive module controller may include one or more processors and memory communicatively coupled with the one or more processors. The memory may store one or more modules to perform various functionalities of the drive module(s) 814. Furthermore, the drive module(s) 814 also include one or more communication connection(s) that enable communication by the respective drive module with one or more other local or remote computing device(s).

In at least one example, the direct connection 812 may provide a physical interface to couple the one or more drive module(s) 814 with the body of the vehicle 802. For example, the direct connection 812 may allow the transfer of energy, fluids, air, data, etc. between the drive module(s) 814 and the vehicle 802. In some examples, the direct connection 812 may further releasably secure the drive module(s) 814 to the body of the vehicle 802.

In at least one example, the localization component 820, perception component 822, the planning component 824, and/or the defog/defrost control system 830, as described above, and may send their respective outputs, over the one or more network(s) 832, to one or more computing device(s) 834. In at least one example, the localization component 820, the perception component 822, the planning component 824, and/or defog/defrost control system 830 may send their respective outputs to the one or more computing device(s) that make up defogging/defrosting control system 830 at a particular frequency, after a lapse of a predetermined period of time, in near real-time, etc.

The processor(s) 816 of the vehicle 802 and/or the processor(s) 836 of the computing device(s) 834 may include any suitable processor capable of executing instructions to process data and perform operations as described herein. By way of example and not limitation, the processor(s) 816 and 836 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 818 and 838 are examples of non-transitory computer-readable media. The memory 818 and 838 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, for example as shown in FIG. 8, defog/defrost control system 830 and/or controller(s) 1-6 may include logic and/or hardware configured to receive the sensor signals and process the information to determine and/or predict the presence of fogging and/or frosting on one or more windows of one or more encased sensor systems 806a. As shown in FIG. 8, the components of defog/defrost control system 830 may be associated with one or more of the vehicle computing device 804 on board the vehicle 802 or the remote computing device(s) 834. Likewise, one or more controllers 106 may be in communication with and/or be part of the vehicle computing device 804 on board of vehicle 802 or the remote computing device(s) 834.

It should be noted that while FIG. 8 is illustrated as a distributed system, in alternative examples, components of the vehicle 802 may be associated with the computing device(s) that make up defogging/defrosting control system 830, and/or components of the computing device(s) that make up defogging/defrosting control system 830 may be associated with the vehicle 802. That is, the vehicle 802 may perform one or more of the functions associated with the computing device(s) that make up defogging/defrosting control system 830 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture of system 800 shown in FIG. 8 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture of system 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture of system 800 may be transmitted to system 800 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses

A. A vehicle comprising: a housing encasing a sealed space, the housing comprising a window configured to allow transmission of electromagnetic emissions; a heater disposed in or on the housing; and a rotatable assembly disposed in the housing and configured to rotate relative to the housing, the rotatable assembly comprising: an emitter to emit the electromagnetic emissions through the window into an environment; a detector to detect electromagnetic emissions reflected through the window from objects in the environment; and a protrusion extending from a portion the rotatable assembly configured to move air within the sealed space to promote convective heat transfer from the heater to the window during rotation of the rotatable assembly within the housing.

B. The vehicle of paragraph A, wherein the housing further comprises a base, the base comprising: a lower portion housing electronics for controlling the rotatable assembly; an upper portion thermally coupled to the heater; and a thermal isolator interposed between the lower portion and the upper portion to thermally insulate the lower portion and the electronics from the upper portion and the heater.

C. The vehicle of paragraph B, wherein the upper portion of the base is in contact with the window and is configured to conductively transfer heat from the heater to the window.

D. The vehicle of any of paragraphs A-C, wherein the protrusion comprises a plurality of fins or vanes extending radially or axially from a center portion of the rotatable assembly.

E. The vehicle of any of paragraphs A-D, further comprising: one or more computing devices communicatively coupled to the vehicle, wherein the one or more computing devices are configured to: determine or predict presence of fogging or frosting on a surface of the window; and cause, based on the presence of fogging or frosting, activation of the heater.

F. An encased sensor system comprising: a housing comprising a base, a window, and a top portion; a sensor system at least partially encased and sealed in the housing, the sensor system configured to transmit and receive electromagnetic emissions; a heater in a portion of the housing; and one or more computing devices including one or more processors, wherein the one or more computing devices are configured to control the heater to defog or defrost the window.

G. The encased sensor system of paragraph F, wherein the base comprises: a lower portion housing electronics for controlling the encased sensor system; an upper portion thermally coupled to the heater; and a thermal isolator interposed between the lower portion and the upper portion to thermally insulate the lower portion and the electronics from the upper portion and the heater.

H. The encased sensor system of paragraph G, wherein the upper portion of the base is in contact with the window and is configured to conductively transfer heat from the heater to the window.

I. The encased sensor system of any of paragraphs F-H, the heater comprising a resistance heater.

J. The encased sensor system of any of paragraphs F-I, further comprising a fan.

K. The encased sensor system of any of paragraphs F-J, wherein the sensor system comprises a mechanical sensor system having at least one moving component.

L. The encased sensor system of paragraph K, wherein the mechanical sensor system comprises a mechanical lidar.

M. The encased sensor system of paragraph K, wherein the moving component comprises a rotatable assembly with one or more fins or vanes extending radially or axially from a center portion of the rotatable assembly.

N. A method of defogging or defrosting a transmission window of an encased sensor system comprising: determining or predicting a presence of fogging or frosting on a surface of a transmission window of a sealed sensor system housing; activating a heater provided inside the sealed sensor system housing; and convection heating the transmission window of the sealed sensor system housing to cause defogging or defrosting of the transmission window.

O. The method of paragraph N, wherein determining or predicting the presence of fogging or frosting on the surface of the transmission window comprises: detecting at least one of an environmental condition inside the sealed sensor system housing, an environmental condition outside the sealed sensor system housing, an optical transmission of the transmission window, an electrical resistance at a surface of the transmission window, or a threshold resolution of a signal generated by the encased sensor system.

P. The method of paragraph N or O, wherein activating the heater comprises causing an electric current to travel through a resistance heater.

Q. The method of any of paragraphs N-P, wherein convection heating the transmission window comprises activating a fan provided inside the sealed sensor system housing.

R. The method of any of paragraphs N-Q, wherein convection heating the transmission window comprises activating a moving component of the encased sensor system to cause circulation of heat within the sealed sensor system housing.

S. The method of paragraph R, further comprising modifying a rotational speed of the moving component wherein the moving component is coupled to an emitter and/or sensor of the encased sensor system.

T. The method of any of paragraphs N-S, further comprising: detecting or predicting that the fogging or frosting on the transmission window has been extinguished; and deactivating, based on detecting or predicting that the fogging or frosting has been extinguished, the heater.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

What is claimed is:

1. A vehicle comprising:
a housing encasing a sealed space, the housing comprising a window configured to allow transmission of electromagnetic emissions;

a heater disposed in or on the housing; and a rotatable assembly disposed in the housing and configured to rotate relative to the housing, the rotatable assembly comprising:
- an emitter to emit the electromagnetic emissions through the window into an environment;
- a detector to detect electromagnetic emissions reflected through the window from objects in the environment; and
- a protrusion extending from a portion of the rotatable assembly disposed in the housing configured to move air within the sealed space to promote convective heat transfer from the heater to the window during rotation of the rotatable assembly within the housing.

2. The vehicle of claim 1, wherein the housing further comprises a base, the base comprising:
- a lower portion housing electronics for controlling the rotatable assembly;
- an upper portion thermally coupled to the heater; and
- a thermal isolator interposed between the lower portion and the upper portion to thermally insulate the lower portion and the electronics from the upper portion and the heater.

3. The vehicle of claim 2, wherein the upper portion of the base is in contact with the window and is configured to conductively transfer heat from the heater to the window.

4. The vehicle of claim 1, wherein the protrusion comprises a plurality of fins or vanes extending radially or axially from a center portion of the rotatable assembly.

5. The vehicle of claim 1, further comprising:
- one or more computing devices communicatively coupled to the vehicle, wherein the one or more computing devices are configured to:
  - determine or predict a presence of fogging or frosting on a surface of the window; and
  - cause, based on the presence of fogging or frosting on the surface of the window, activation of the heater.

6. An encased sensor system comprising:
- a housing comprising a base, a window, and a top portion;
- a sensor system at least partially encased and sealed in the housing, the sensor system comprising a rotatable assembly and configured to transmit and receive electromagnetic emissions, wherein a protrusion extends from the rotatable assembly and promotes air circulation in the housing;
- a heater in a portion of the housing; and
- one or more computing devices including one or more processors, wherein the one or more computing devices are configured to control one or more of the heater or the rotatable assembly to defog or defrost the window.

7. The encased sensor system of claim 6, wherein the base comprises:
- a lower portion housing electronics for controlling the encased sensor system;
- an upper portion thermally coupled to the heater; and
- a thermal isolator interposed between the lower portion and the upper portion to thermally insulate the lower portion and the electronics from the upper portion and the heater.

8. The encased sensor system of claim 7, wherein the upper portion of the base is in contact with the window and is configured to conductively transfer heat from the heater to the window.

9. The encased sensor system of claim 6, the heater comprising a resistance heater.

10. The encased sensor system of claim 6, wherein the sensor system comprises a mechanical sensor system having at least one moving component.

11. The encased sensor system of claim 10, wherein the mechanical sensor system comprises a mechanical lidar.

12. The encased sensor system of claim 10, wherein the at least one moving component comprises a rotatable assembly with one or more fins or vanes extending radially or axially from a center portion of the rotatable assembly.

13. A method of defogging or defrosting a transmission window of an encased sensor system comprising:
- determining or predicting a presence of fogging or frosting on a surface of a transmission window of a sealed sensor system housing;
- activating a heater provided inside the sealed sensor system housing; and
- convection heating the transmission window of the sealed sensor system housing at least in part by activating a rotatable assembly of the encased sensor system that is disposed inside the sealed sensor system housing to cause circulation of air within the sealed sensor system housing to cause defogging or defrosting of the transmission window.

14. The method of claim 13, wherein determining or predicting the presence of fogging or frosting on the surface of the transmission window comprises:
- detecting at least one of an environmental condition inside the sealed sensor system housing, an environmental condition outside the sealed sensor system housing, an optical transmission of the transmission window, an electrical resistance at a surface of the transmission window, or a threshold resolution of a signal generated by the encased sensor system.

15. The method of claim 13, wherein activating the heater comprises causing an electric current to travel through a resistance heater.

16. The method of claim 13, wherein convection heating the transmission window comprises activating a fan provided inside the sealed sensor system housing.

17. The method of claim 13, further comprising modifying a rotational speed of the rotatable assembly wherein the rotatable assembly is coupled to an emitter and/or sensor of the encased sensor system.

18. The method of claim 13, further comprising:
- detecting or predicting that the fogging or frosting on the transmission window has been extinguished; and
- deactivating, based on detecting or predicting that the fogging or frosting has been extinguished, the heater.

19. The encased sensor system of claim 6, wherein controlling the heater comprises causing an electric current to travel through a resistance heater.

20. The method of claim 13, wherein a protrusion extends from the rotatable assembly to promote air circulation.

* * * * *